(12) United States Patent
Muramatsu et al.

(10) Patent No.: US 10,780,990 B2
(45) Date of Patent: Sep. 22, 2020

(54) PROJECTION SYSTEM, PROJECTION METHOD, FLYING OBJECT SYSTEM, AND FLYING OBJECT

(71) Applicant: Panasonic Intellectual Property Management Co., Ltd., Osaka (JP)

(72) Inventors: Fumio Muramatsu, Kyoto (JP); Yukinaga Seki, Osaka (JP); Masayuki Toyama, Kanagawa (JP); Hisao Sasai, Osaka (JP); Naoto Yumiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/371,170

(22) Filed: Apr. 1, 2019

(65) Prior Publication Data

US 2019/0225350 A1 Jul. 25, 2019

Related U.S. Application Data

(63) Continuation of application No. PCT/JP2017/014334, filed on Apr. 6, 2017.

(30) Foreign Application Priority Data

Oct. 14, 2016 (JP) .................................. 2016-202790
Nov. 29, 2016 (JP) .................................. 2016-231896

(51) Int. Cl.
*B64D 47/02* (2006.01)
*H04N 9/31* (2006.01)
(Continued)

(52) U.S. Cl.
CPC ................ *B64D 47/02* (2013.01); *B64B 1/26* (2013.01); *B64C 39/00* (2013.01); *B64D 47/08* (2013.01);
(Continued)

(58) Field of Classification Search
None
See application file for complete search history.

(56) References Cited

U.S. PATENT DOCUMENTS

| 5,114,224 A | 5/1992 | Miyamoto et al. |
| 6,278,904 B1 | 8/2001 | Ishii |

(Continued)

FOREIGN PATENT DOCUMENTS

| EP | 0447610 A1 * | 9/1991 | ............. G09F 19/18 |
| EP | 447610 A1 | 9/1991 | |

(Continued)

OTHER PUBLICATIONS

The Extended European Search Report dated Jul. 31, 2019 for the related European Patent Application No. 17859906.4.
(Continued)

*Primary Examiner* — James M Anderson, II
(74) *Attorney, Agent, or Firm* — McDermott Will & Emery LLP

(57) ABSTRACT

A projection system of the present disclosure includes: a flying object having an exterior body, a flying device that causes the exterior body to fly, and an image capturing device that captures an image; a projection device that projects a capture-dependent image on the exterior body, the captured-dependent image depending on the image; and a controller that causes the projection device to project the capture-dependent image.

8 Claims, 13 Drawing Sheets

(51) Int. Cl.

| | | |
|---|---|---|
| *B64B 1/26* | (2006.01) | |
| *B64D 47/08* | (2006.01) | |
| *G09F 21/08* | (2006.01) | |
| *H04N 5/232* | (2006.01) | |
| *G09F 21/06* | (2006.01) | |
| *H04N 5/74* | (2006.01) | |
| *G09F 19/00* | (2006.01) | |
| *B64C 39/00* | (2006.01) | |

(52) U.S. Cl.
 CPC .............. *G09F 19/00* (2013.01); *G09F 21/06* (2013.01); *G09F 21/08* (2013.01); *H04N 5/23238* (2013.01); *H04N 5/74* (2013.01); *H04N 9/3147* (2013.01)

(56) References Cited

U.S. PATENT DOCUMENTS

| 2011/0292348 | A1* | 12/2011 | Tobita ................. B64B 1/28 353/28 |
| 2012/0135025 | A1 | 5/2012 | Flechtner et al. |
| 2012/0212647 | A1 | 8/2012 | Ueno et al. |
| 2015/0022725 | A1 | 1/2015 | Watanabe |
| 2017/0043005 | A1 | 2/2017 | Flechtner et al. |
| 2017/0276833 | A1 | 9/2017 | Narabu |

FOREIGN PATENT DOCUMENTS

| JP | 4-018613 | 1/1992 | |
| JP | 5-294288 | 11/1993 | |
| JP | 8-314401 | 11/1996 | |
| JP | 2002-006784 | 1/2002 | |
| JP | 2006-129472 | 5/2006 | |
| JP | 2006-180022 | 7/2006 | |
| JP | 2010-166235 | 7/2010 | |
| JP | 2011-095430 | 5/2011 | |
| JP | 2011-245925 | 12/2011 | |
| JP | 2015-022017 | 2/2015 | |
| JP | 2016-106117 | 6/2016 | |
| WO | 2016/059835 | 4/2016 | |
| WO | WO-2016059835 A1 * | 4/2016 | ............... B64B 1/26 |

OTHER PUBLICATIONS

International Search Report of PCT application No. PCT/JP2017/014334 dated Jun. 27, 2017.

* cited by examiner

PROJECTION SYSTEM, PROJECTION METHOD, FLYING OBJECT SYSTEM, AND FLYING OBJECT

BACKGROUND

1. Technical Field

The present disclosure relates to a projection system that projects an image on a flying object, a projection method, a flying object system, and a flying object on which the image is projected.

2. Description of the Related Art

Patent Literature 1 describes a technology in which an image or the like is projected on a balloon of an airship. In the technology, a projector projects the image on a transmission-type screen, which is provided on the balloon, from the inside or the outside of the airship.

CITATION LIST

Patent Literature

PTL 1: Unexamined Japanese Patent Publication No. H08-314401

SUMMARY

A projection system of the present disclosure includes: a flying object having an exterior body, a flying device that causes the exterior body to fly, and an image capturing device that captures an image; a projection device that projects a capture-dependent image on the exterior body, the captured-dependent image depending on the image; and a controller that causes the projection device to project the capture-dependent image.

A flying object of the present disclosure includes: an image capturing device; an exterior body on which a capture-dependent image depending on an image captured by the image capturing device is projected; and a flying device that causes the exterior body to fly.

A flying object system of the present disclosure includes: a flying object having an image capturing device, an exterior body on which a capture-dependent image depending on an image captured by the image capturing device is projected, and a flying device that causes the exterior body to fly; and a controller that outputs a signal for projecting the capture-dependent image on the exterior body.

A projection method of the present disclosure is a projection method of projecting an image on an exterior body of a flying object. Herein, the flying object has the exterior body, a flying device that causes the exterior body to fly, and an image capturing device. The projection method causes a projection device to project a capture-dependent image on the exterior body, the capture-dependent image depending on an image captured by the image capturing device.

The projection system in the present disclosure or the like makes it possible to improve rendition effects of the flying object.

DETAILED DESCRIPTION

Hereinafter, an exemplary embodiment will be described in detail with reference to the drawings as necessary. However, description that is in more detail than necessary is occasionally omitted. For example, detailed description about already well-known matters and overlapped description about the substantially same configurations are occasionally omitted. This is because the following description is avoided from being unnecessarily redundant, and a person skilled in the art is made to easily understand the present disclosure. Further, in the following description of the exemplary embodiment, representations using "substantially" such as "substantially parallel" and "substantially orthogonal" may be employed. For instance, "substantially parallel" means not only "completely parallel" but "approximately parallel," i.e., means that a difference of several percent may be included therein. Other representations using "substantially" are the same as the above. Note that, the accompanying drawings and the following description are provided for a person skilled in the art to fully understand the present disclosure, and do not intend to limit the subject matter described in claims.

Exemplary Embodiment

1. Configuration of Projection System

[1-1. Schematic Configuration of Projection System]

Figure 1:
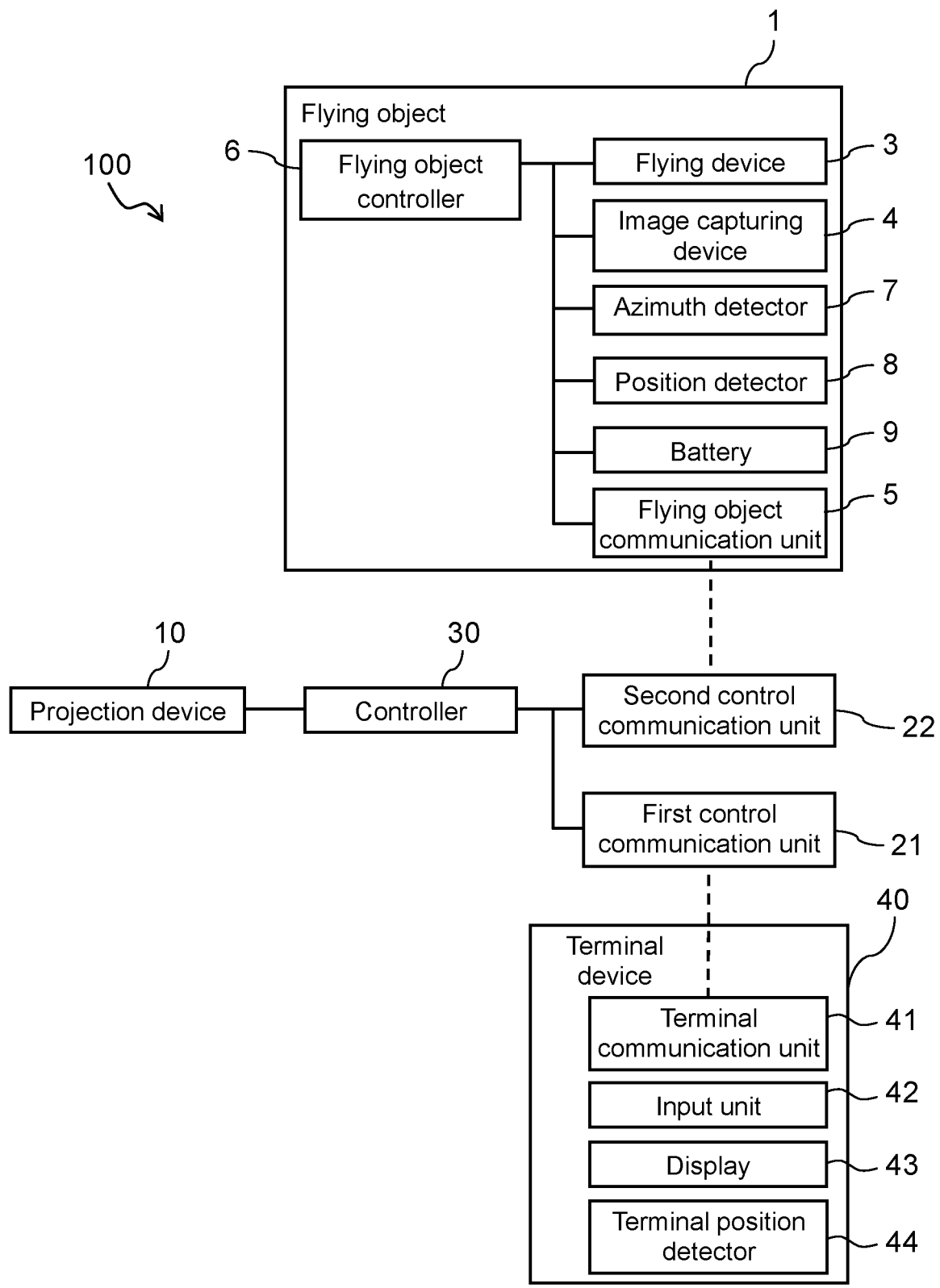
FIG. 1 is a block diagram showing a schematic configuration of a projection system in accordance with an exemplary embodiment.
Figure 2:
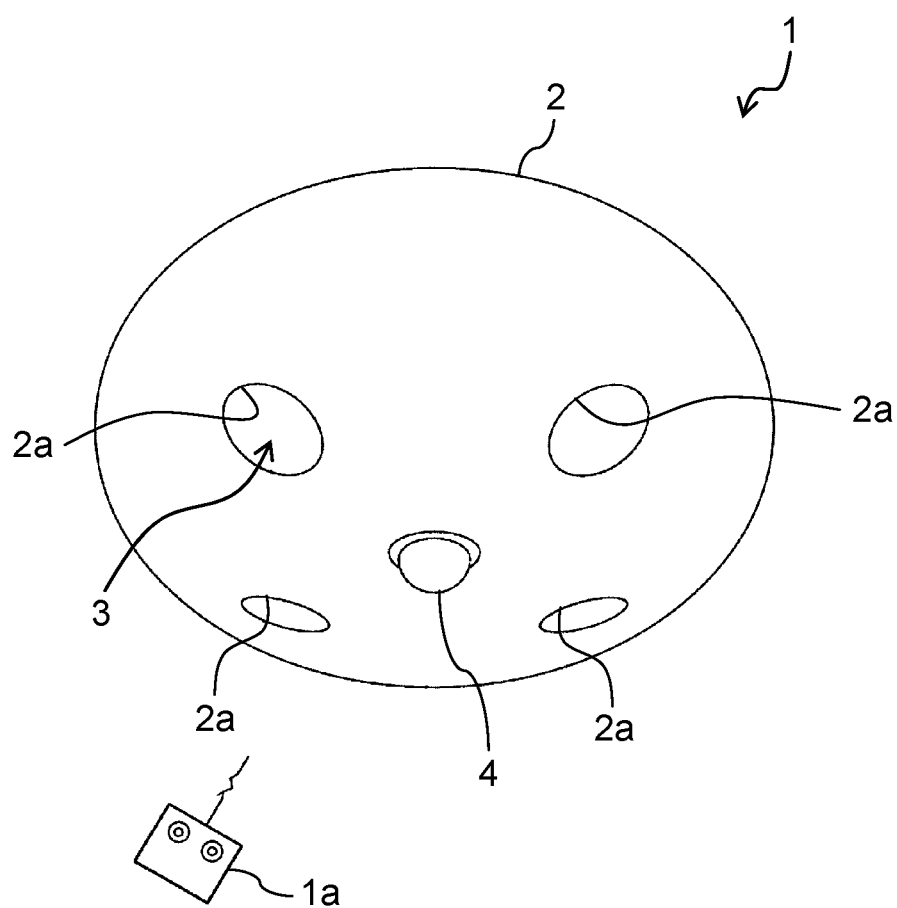
FIG. 2 is a perspective view of a flying object in FIG. 1 when viewed obliquely from below.
Figure 3:
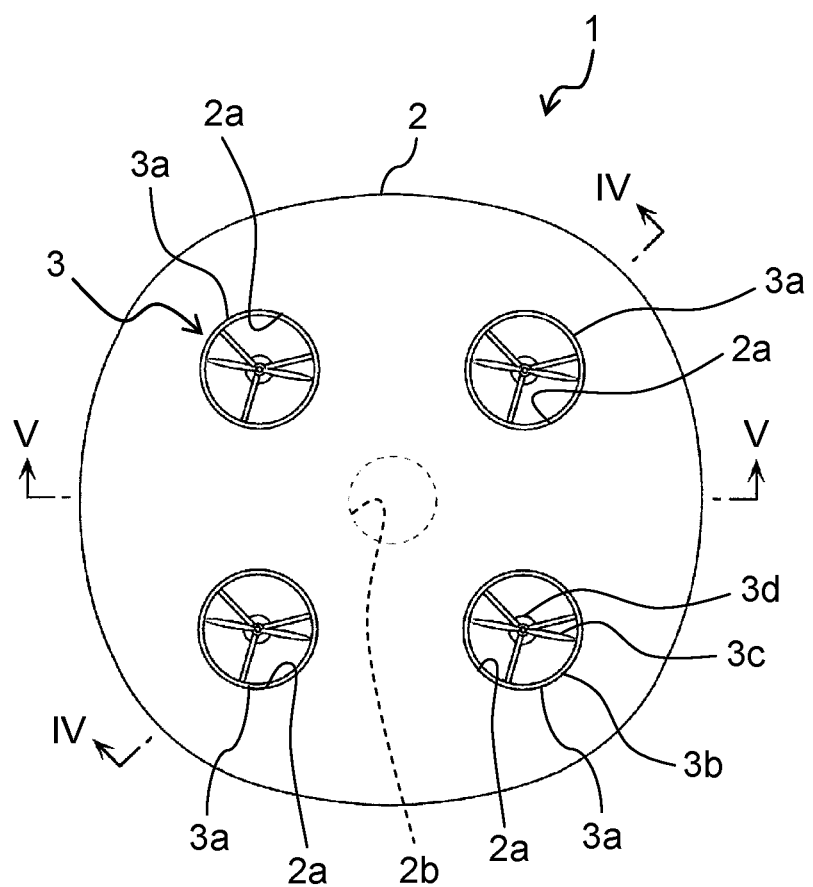
FIG. 3 is a plan view of a flying object in FIG. 2 when viewed from above.

First, a schematic configuration of projection system 100 in accordance with an exemplary embodiment will be described with reference to FIGS. 1 through 3. FIG. 1 is a block diagram showing the schematic configuration of projection system 100 in accordance with the exemplary embodiment. FIG. 2 is a perspective view of flying object 1 in FIG. 1 when viewed obliquely from below. FIG. 3 is a plan view of flying object 1 in FIG. 2 when viewed from above.

Projection system 100 includes flying object 1 capable of flying by itself, projection device 10 that projects an image on flying object 1, second control communication unit (second communication unit) 22 that communicates with flying object 1, first control communication unit (fourth communication unit) 21 that communicates with terminal device 40, and controller 30. Projection system 100 may further include terminal device 40. Terminal device 40 may be dedicated to projection system 100. Alternatively, a general-purpose terminal device may be employed, substituting for terminal device 40.

Flying object 1 includes buffering body (exterior body) 2 on which an image is projected by projection device 10, flying device 3 that is covered with buffering body 2 and causes buffering body 2 to fly, image capturing device 4 that captures images around buffering body 2, and flying-object communication unit (first communication unit) 5 that communicates with second control communication unit 22. In the present exemplary embodiment, buffering body 2 is formed of an expandable and contractible bag-like body, and also referred to as a balloon, hereafter. Image capturing device 4 is attached to a lower part of balloon 2. Flying device 3 is of a propeller driven type, and disposed in balloon 2. Flying-object communication unit 5 is disposed in balloon 2. Projection device 10 projects a capture-dependent image, which depends on a captured image of image capturing device 4, to balloon 2. As the capture-dependent image, a captured image, itself, of image capturing device 4 may be employed, or a processed image may be employed. Herein, the processed image is formed by applying processing, such as decoration, animation processing, and addition and modification of character, to the captured image. Therefore, the capture-dependent image means both the captured image itself and the processed image in which the processing is applied to the captured image.

Terminal device 40 is disposed apart from flying object 1 and controller 30. Terminal device 40 is a device capable of communicating with controller 30 or the like. Terminal device 40 may be an information processing device such as a computer. More specifically, terminal device 40 may be a mobile phone or a portable terminal such as a smart phone, a smart watch, a tablet, or a small personal computer. In the present exemplary embodiment, terminal device 40 is a general-purpose terminal device owned by a person around flying object 1, but not limited to this. Terminal device 40 may be a terminal device owned by a driver of flying object 1, or may be a terminal device owned by an operator of projection system 100. Terminal device 40 includes terminal communication unit 41 that communicates with first control communication unit 21, input unit 42 that receives input from the outside, display 43 that displays an image or the like, and terminal position detector 44 that detects a position of terminal device 40. Display 43 is constituted by a display panel such as a liquid crystal panel, an organic EL (Electro Luminescence) panel, or an inorganic EL panel. Input unit 42 may be constituted by an input device such as a keypad, or may be constituted by, for example, a touch screen, i.e., a device that allows direct input to display 43. Terminal position detector 44 may be constituted by a communication device for GPS (Global Positioning System) or the like, for example. A plurality of terminal devices 40 may be disposed in projection system 100.

Second control communication unit 22 communicates with flying object communication unit 5 wirelessly, and receives various kinds of information from flying object communication unit 5. The various kinds of information include a captured image of image capturing device 4, and the like. First control communication unit 21 communicates with terminal communication unit 41 wirelessly, and receives various kinds of information through terminal communication unit 41. The various kinds of information include information inputted through input unit 42, information stored in terminal device 40, and the like. First control communication unit 21 and second control communication unit 22 send the received information to controller 30. Further, first control communication unit 21 sends various kinds of information to terminal device 40 through terminal communication unit 41. The various kinds of information include a capture-dependent image that depends on the captured image of image capturing device 4 received from flying object communication unit 5 by controller 30, and the like.

Controller 30 controls projection system 100. Controller 30 receives various kinds of information from second control communication unit 22. The various kinds of information include the captured image of image capturing device 4, and the like. Further, controller 30 receives information from terminal device 40 through first control communication unit 21. Controller 30 processes the captured image based on the received information, and generates a capture-dependent image depending on the captured image. For instance, controller 30 superimposes the information, which is received from terminal device 40, on the captured image to generate a capture-dependent image. Controller 30 outputs a signal to projection device 10 such that projection device 10 projects the processed capture-dependent image to balloon 2.

[1-2. Structure of Flying Object]

Figure 4:
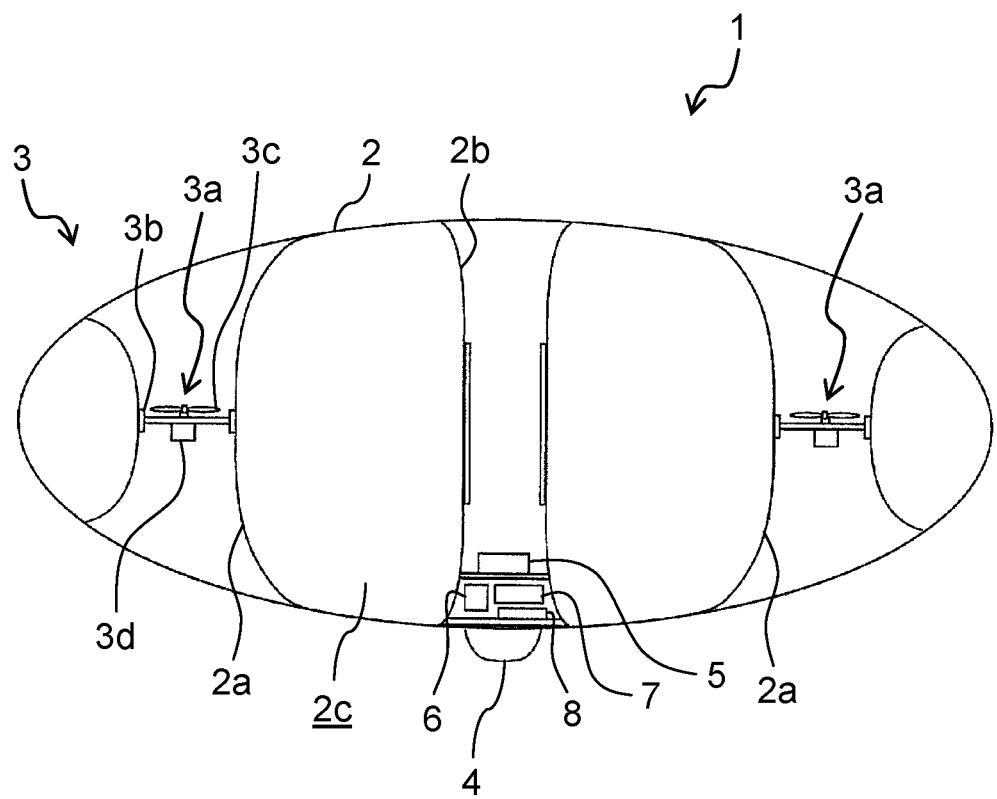
FIG. 4 is a cross-sectional side view of the flying object taken along line IV-IV in FIG. 3.
Figure 5:
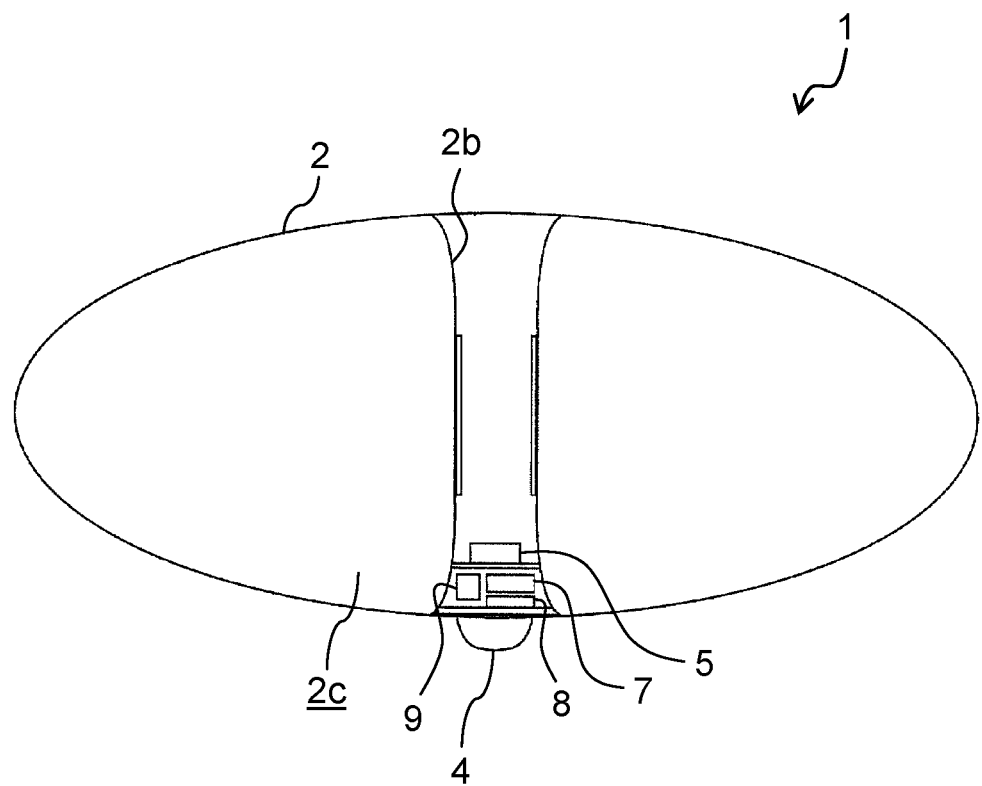
FIG. 5 is a cross-sectional side view of the flying object taken along line V-V in FIG. 3.

A structure of flying object 1 will be described with reference to FIGS. 1 through 5. FIG. 4 is a cross-sectional side view of flying object 1 taken along line IV-IV in FIG. 3. FIG. 5 is a cross-sectional side view of flying object 1 taken along line V-V in FIG. 3. Flying object 1 in accordance with the present exemplary embodiment includes one balloon 2, and four rotor units 3a serving as flying device 3. Furthermore, flying object 1 includes image capturing device 4, flying object communication unit 5, flying object controller 6, azimuth detector 7, position detector 8, battery 9, and the like. In the present exemplary embodiment, as shown in FIG. 2, flying object 1 wirelessly communicates with maneuver 1a, which is disposed apart from flying object 1, and operates in accordance with a command signal transmitted from maneuver 1a, but not limited to this. Flying object communication unit 5 may communicate with maneuver 1a wirelessly, or another communication unit for communicating with maneuver 1a wirelessly may be provided. Further, maneuver 1a may function as terminal device 40, or terminal device 40 may function as maneuver 1a.

In accordance with the present exemplary embodiment, balloon 2 serving as a buffering body has a hollow structure, and balloon 2 has, for example, a bag-like body shaped into an ellipsoid whose upper and lower portions are flattened when expanded. Balloon 2 is made of a white sheet material, for example, and an exterior surface of balloon 2 functions as a screen on which an image can be projected, when expanded. Note that, the buffering body of flying object 1 may be made of a solid material such as sponge or rubber. The buffering body is preferably made of a material capable of absorbing a shock when colliding with an object. Furthermore, an exterior surface of the buffering body is preferably configured such that a person around flying object 1 can recognize an image projected on the exterior surface. The inside of balloon 2 is filled with a gas for generating buoyant force, such as helium gas. As the gas with which the inside of balloon 2 is filled, the other gas whose density is lower than that of air may be employed. Thus, flying object 1 can reduce a load of flying device 3 when flying. Further, even if flying device 3 is not in operation, fling object 1 can fly upward by itself. As a result, for example, flying device 3 can concentrate the operations of moving flying object 1 horizontally and downwardly, thereby making it possible to achieve energy saving.

Cylindrical ventholes 2a, which have the same number (four in the present exemplary embodiment) of rotor units 3a, are provided in balloon 2. Each of ventholes 2a is formed through balloon 2 vertically along a short axis of balloon 2. Ventholes 2a each are arranged apart from a central axis of balloon 2, which also serves as the short axis of balloon 2, in a diameter direction. In the present exemplary embodiment, four ventholes 2a are disposed radially from the central axis of balloon 2 at equal intervals. Specifically, four ventholes 2a each are disposed at 90-degree intervals about the central axis. Four ventholes 2a are spaced from one another sufficiently.

Inside each of ventholes 2a, a corresponding one of rotor units 3a is disposed. In the present exemplary embodiment, the corresponding one of rotor units 3a is disposed inside each of ventholes 2a so as not to be protruded and exposed from the exterior surface of balloon 2. Thus, rotor units 3a are prevented from coming into direct contact with the outside of ventholes 2a. The corresponding one of rotor units 3a generates a thrust in an axial direction of each of ventholes 2a.

The corresponding one of rotor units 3a includes frame 3b that has a cylindrical external shape, propeller 3c disposed in frame 3b, and motor 3d that rotates propeller 3c. A rotation shaft of propeller 3c is rotatably supported to an axial center of frame 3b through frame 3b. Motor 3d is connected to the rotation shaft of propeller 3c and fixed to frame 3b. The corresponding one of rotor units 3a is disposed such that the rotation shaft of propeller 3c is aligned with the axis of each of ventholes 2a.

In the center of balloon 2, there is formed one cylindrical hollow 2b that extends along the central axis of balloon 2. Among upper and lower surfaces of balloon 2, hollow 2b is opened in at least the lower surface. This forms one gas space 2c that extends so as to surround four ventholes 2a and one hollow 2b in balloon 2. Gas space 2c, mentioned above, is a closed space for expanding balloon 2, and filled with a gas such as helium gas.

Flying object communication unit 5, flying object controller 6, azimuth detector 7, position detector 8, and battery 9 are disposed in hollow 2b. Image capturing device 4 is disposed in an opening provided in a lower part of hollow 2b. Azimuth detector 7 may be constituted by a gyroscope sensor (referred to as an angular velocity sensor), a magnetic sensor, an angular acceleration sensor, and the like. Azimuth detector 7 detects information on an azimuth of flying object 1, which serves as a rotation angle of flying object 1 about the central axis of balloon 2, i.e., azimuth information. Azimuth detector 7 sends the detected azimuth information to flying object controller 6 in real time. Flying object controller 6 sends the detected azimuth information to second control communication unit 22 through flying object communication unit 5 in real time.

Position detector 8 detects information on a position of flying object 1, which includes a plan position and an altitude, i.e., position information. Note that, the plan position is a position measured horizontally, i.e., along a sea level of the earth. Position detector 8 may be constituted by a gyroscope sensor, a linear acceleration sensor, a communication device for GPS, and the like. Position detector 8 sends the detected position information to flying object controller 6 in real time. Flying object controller 6 sends the detected position information to second control communication unit 22 through flying object communication unit 5 in real time.

Battery 9 may be a primary battery capable of discharging accumulated electric power, or a rechargeable battery capable of charging and discharging electric power. Battery 9 supplies electric power to rotor units 3a, image capturing device 4, flying object communication unit 5, flying object controller 6, azimuth detector 7, position detector 8, and the like.

Flying object controller 6 may be constituted by a circuit mainly composed of a microcomputer, or may be constituted by a circuit without a microcomputer. Flying object controller 6 controls the entirety of flying object 1, i.e., receives a command signal transmitted from maneuver 1a and controller 30 and controls rotor units 3a, image capturing device 4, flying object communication unit 5, azimuth detector 7, position detector 8, and the like, based on the received command signal.

Flying object communication unit 5 is configured to communicate with second control communication unit 22 wirelessly. Flying object communication unit 5 may be a communication circuit. Flying object communication unit 5 may communicate with second control communication unit 22 wirelessly in a direct manner, or may communicate wirelessly in an indirect manner. In the case where the wireless communication between flying object communication unit 5 and second control communication unit 22 is performed in an indirect manner, a communications network such as the Internet may be employed, for example. In this case, wireless LAN (Local Area Network) such as Wi-Fi (registered trademark) (Wireless Fidelity) may be applied to the wireless communication, for example. Alternatively, a mobile telecommunications standard used in mobile communication systems such as third generation mobile communication system (3G), fourth generation mobile communication system (4G), and LTE (registered trademark) (Long Term Evolution) may be applied, when the wireless communication between flying object communication unit 5 and second control communication unit 22 is performed in an indirect manner.

A digital camera, a digital camcorder, and the like, which record captured images as digital data, may be employed as image capturing device 4. In the present exemplary embodiment, image capturing device 4 is a device capable of capturing motion images, but not limited to this. A device that can capture only static images or both of static images and motion images may be employed as image capturing device 4. In the present exemplary embodiment, image capturing device 4 has a wide viewing angle. Specifically, image capturing device 4 is a 360-degree camera having a viewing angle of 360 degrees. Image capturing device 4 can generate a captured image that displays an area ranging from a lower part to a side part of balloon 2 at a time. Image capturing device 4 sends the captured image, generated above, to flying object controller 6 in real time. Flying object controller 6 sends the captured image to second control communication unit 22 through flying object communication unit 5. Accordingly, the captured image of image capturing device 4 is sent to second control communication unit 22 in real time in accordance with the capturing operation of image capturing device 4.

Further, in flying object 1, various kinds of apparatuses such as a luminous body, a speaker, a microphone, and various kinds of measuring equipment may be mounted in balloon 2, for example. Herein, the luminous body includes an illumination lamp, an LED (Light Emitting Diode) element, and the like. The illumination lamp may be used for illuminating the surrounding of flying object 1. The luminous body may be used for notifying a person around flying object 1 of its position in a dark place or the like at night. The speaker emits sound, voice, and the like to the surrounding of flying object 1. The microphone may collect sound from the surrounding of flying object 1.

[1-3. Detailed Configuration of Projection System]

Figure 6:
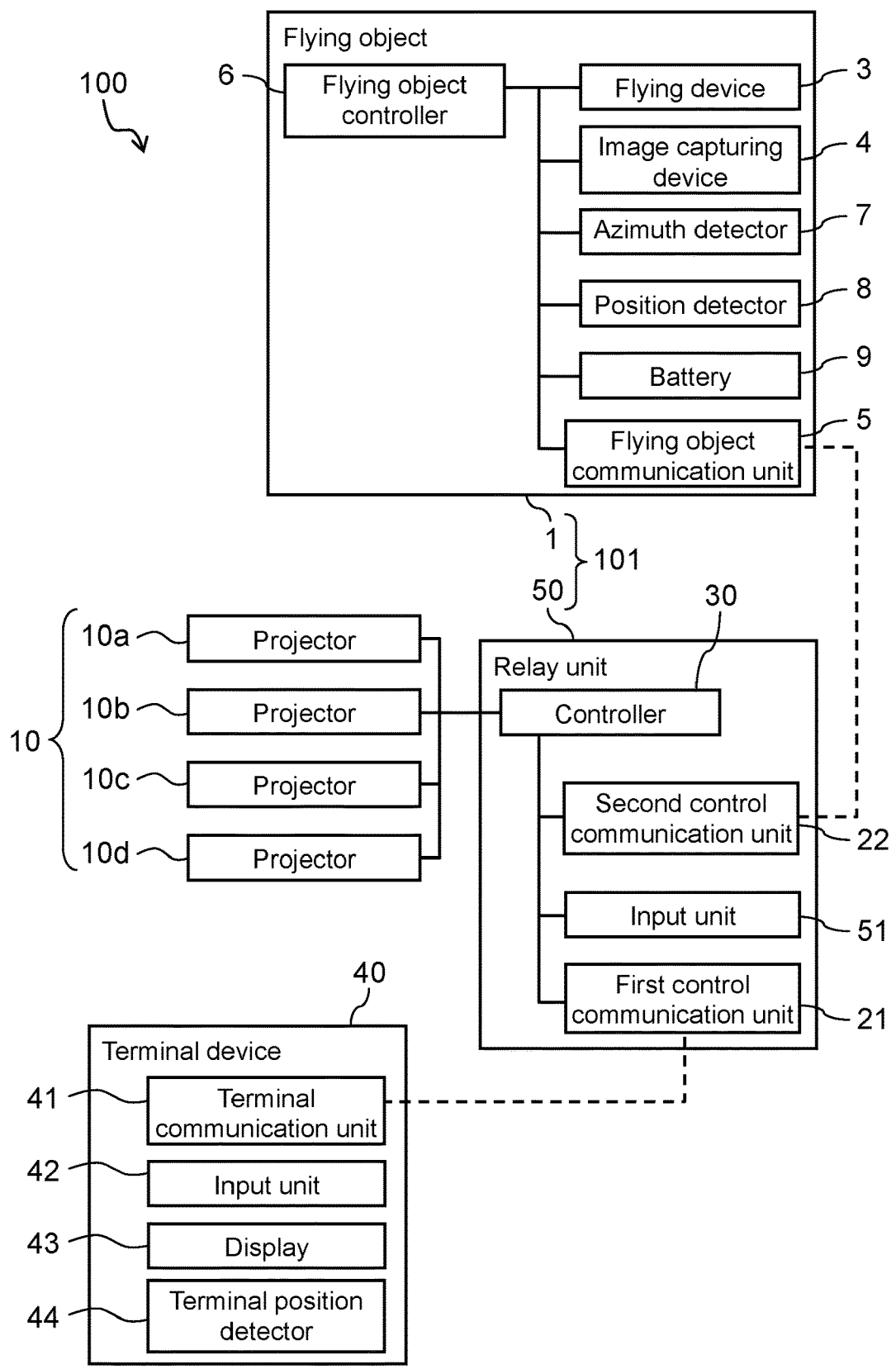
FIG. 6 is a block diagram exemplarily showing a schematic configuration of the projection system in accordance with the exemplary embodiment.
Figure 7:
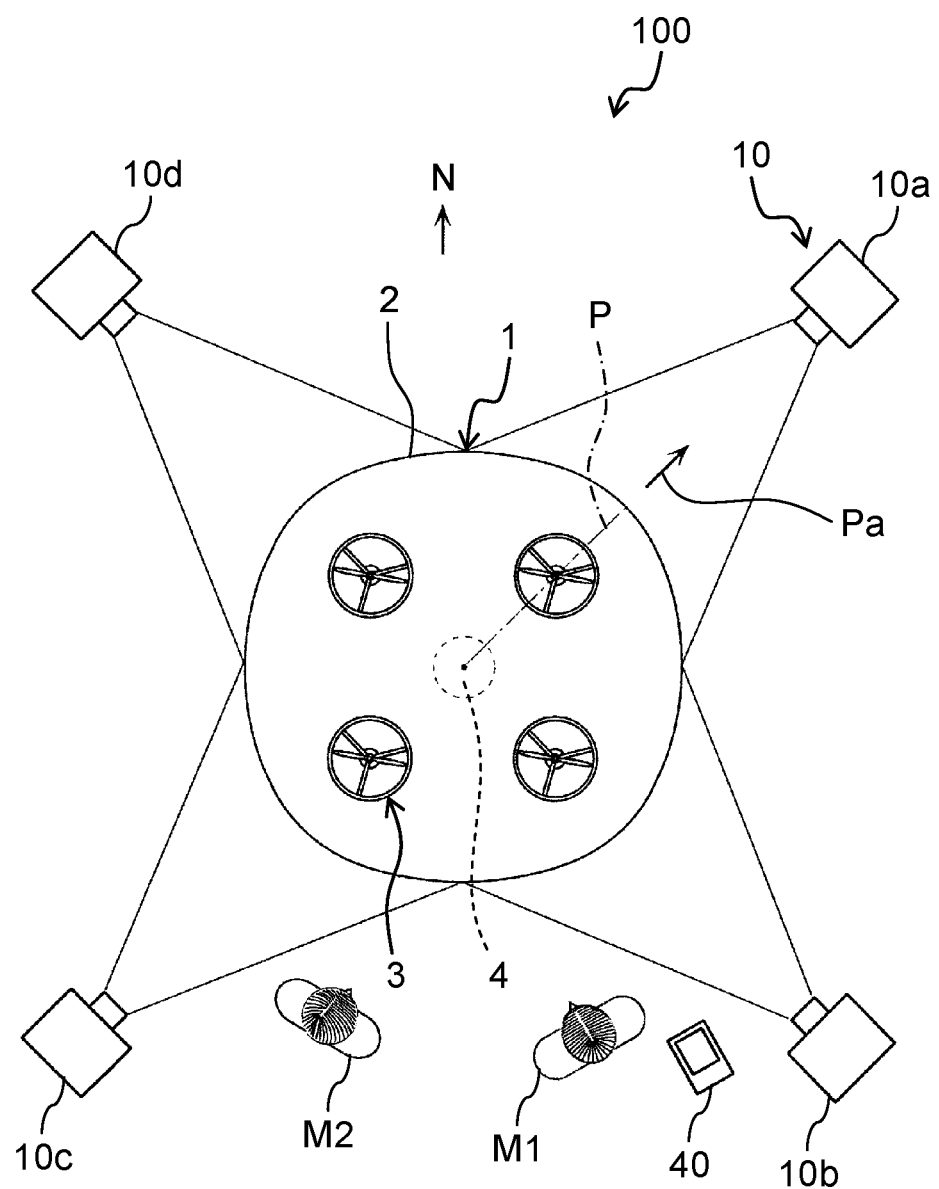
FIG. 7 is a plan view exemplarily showing a positional relationship between the flying object and projection devices of the projection system in accordance with the exemplary embodiment when viewed from above.

With reference to FIGS. 6 and 7, a detailed configuration of projection system 100 in accordance with the present exemplary embodiment will be described. FIG. 6 is a block diagram exemplarily showing a schematic configuration of projection system 100 in accordance with the exemplary embodiment. FIG. 7 is a plan view exemplarily showing a positional relationship between flying object 1 and projection device 10 in projection system 100 in accordance with the exemplary embodiment, when viewed from above. The present exemplary embodiment describes that flying object 1 is used for performing rendition at a relatively narrow space in buildings such as an event site, but the application of flying object 1 is not limited to this. Flying object 1 can move within a limited area in a space of a building. As shown in FIG. 7, four projectors (projectors 10a to 10d) are disposed at such different positions around flying object 1. Hereinafter, these projectors 10a to 10d are collectively referred to as projection device 10. Projectors 10a to 10d are disposed outside flying object 1. Projecting directions of projectors 10a to 10d each are directed to the center of an area surrounded by four projectors 10a to 10d. Projectors 10a to 10d each project an image to different portions of balloons 2 from a lower part toward an upper part of flying object 1.

As shown in FIG. 6, first control communication unit 21, second control communication unit 22, and controller 30 are combined to constitute one unit, i.e., specifically constitute relay unit 50 that is located between flying object 1 and projection device 10 and controls them. Relay unit 50 includes input unit 51 that receives an input for applying processing to a capture-dependent image, which depends on a captured image of image capturing device 4. Herein, the above-mentioned processing includes decoration, animation processing, and addition, modification, and division of characters or the like. Input unit 51 of relay unit 50 may have the same function as input unit 42 of terminal device 40 described later. In other words, input unit 42 of terminal device 40 may function as input unit 51 of relay unit 50, or input unit 51 of relay unit 50 may function as input unit 42 of terminal device 40. In the present exemplary embodiment, relay unit 50 is independent from flying object 1, maneuver 1a (see FIG. 2), projection device 10, and terminal device 40, and disposed apart from these components. For instance, relay unit 50 may be incorporated in a device separated from flying object 1, maneuver 1a, projection device 10, and terminal device 40. The device may be a computer. Flying object 1 and relay unit 50 constitute flying object system 101. Therefore, flying object system 101, general-purpose projection device 10, and general-purpose terminal device 40 can be used to constitute projection system 100. Alternatively, relay unit 50, general-purpose flying object 1, general-purpose projection device 10, and general-purpose terminal device 40 can be used to constitute projection system 100.

Relay unit 50 may be connected to projection device 10 through wires, or may be connected without wires. In the present exemplary embodiment, relay unit 50 is connected to projection device 10 through wires. Note that, in the case where relay unit 50 and projection device 10 are connected to each other without wires, flying object communication unit 5 and second control communication unit 22 are communicated with each other wirelessly, like the communication between relay unit 50 and projection device 10. Alternatively, short-range wireless communications such as Bluetooth (registered trademark) may be applied. In such a case, relay unit 50 may include another communication unit different from first control communication unit 21 and second control communication unit 22. Relay unit 50 can communicate with projection device 10 through another communication unit mentioned above.

First control communication unit 21 and second control communication unit 22 may be configured by communication circuits. Second control communication unit 22 and flying object communication unit 5 perform the above-mentioned communication. Through flying object communication unit 5, second control communication unit 22 receives the captured image of image capturing device 4, azimuth information and position information of flying object 1, and the like, and then sends them to controller 30.

First control communication unit 21 and terminal communication unit 41 are configured to communicate with each other wirelessly. First control communication unit 21 may communicate with terminal communication unit 41 wirelessly in a direct manner, or may communicate wirelessly in an indirect manner. In the case where first control communication unit 21 and terminal communication unit 41 are communicated with each other wirelessly in an indirect manner, the wireless communication between first control communication unit 21 and terminal communication unit 41 may be performed through a communications network such as the Internet. In this case, wireless LAN, such as Wi-Fi (registered trademark), may be applied to the wireless communication, for example. Alternatively, in the case where first control communication unit 21 and terminal communication unit 41 are communicated with each other wirelessly in a direct manner, a mobile telecommunications standard used in mobile communication systems such as third generation mobile communication system (3G), fourth generation mobile communication system (4G), and LTE (registered trademark) (Long Term Evolution) may be applied to the wireless communication. The present exemplary embodiment describes that first control communication unit 21 and terminal communication unit 41 are communicated with each other wirelessly, but not limited to this. First control communication unit 21 and terminal communication unit 41 may be communicated with each other through wires. First control communication unit 21 receives various kinds of information from terminal device 40 through terminal communication unit 41, and sends it to controller 30. Further, first control communication unit 21 sends various kinds of information, which include the capture-dependent image depending on a captured image received from flying object 1, to terminal device 40 in accordance with instructions of controller 30.

Herein, a configuration of terminal device 40 will be described. Terminal device 40 is configured to receive a capture-dependent image, which depends on a captured image of image capturing device 4, through relay unit 50 and terminal communication unit 41 and display the received capture-dependent image on display 43. Terminal device 40 is also configured to be allowed to process the capture-dependent image on display 43 in accordance with the information inputted to input unit 42. The capture-dependent image, which has been received by terminal device 40, may be the captured image itself, or may be a processed image formed by applying processing to the captured image in relay unit 50. Besides, the capture-dependent image may be a processed image formed by applying processing to the captured image in other terminal devices 40.

For instance, the processing applied to the capture-dependent image on display 43 may be any processing such as: superimposed designs on the capture-dependent image, which include characters, signs, and figures; modification and correction of the capture-dependent image; modification of a color and a color tone of the capture-dependent image; decoration of the capture-dependent image; magnification and reduction of the capture-dependent image; division of the capture-dependent image; cutoff of an image; illustration conversion of the capture-dependent image; and animation of the capture-dependent image. Furthermore, a processed portion to which the processing is applied in the capture-dependent image may be configured to move relative to the capture-dependent image, i.e., scroll, shift, rotate, act, and the like on the capture-dependent image.

A user of terminal device 40 can process the capture-dependent image, while checking the capture-dependent image on display 43. Terminal device 40 sends information on the processing applied to the capture-dependent image, which has been received through input unit 42, to the first control communication unit 21 of relay unit 50 through terminal communication unit 41. Furthermore, first control communication unit 21 sends the information on the processing applied to the capture-dependent image to controller 30 of relay unit 50. Further, terminal device 40 may send position information of terminal device 40, information on a position of processing contents displayed within the capture-dependent image, and the like to controller 30, together with the information on the processing applied to the capture-dependent image. The position of processing contents displayed within the capture-dependent image may be specified by a user through input unit 42. Note that, terminal device 40 may be configured not to display the capture-dependent image on display 43. In this case, terminal device 40 may display input information from input unit 42 on display 43.

Controller 30 may be configured in any manner, if having a control function. Controller 30 may be constituted by hardware such as a circuit mainly composed of a microcomputer, or a circuit without a microcomputer. Further, for instance, controller 30 may be configured by executing a software program suitable for each element. In this case, controller 30 may include an arithmetic processing unit and a storage unit for storing a control program, for example. As the arithmetic processing unit, MPU (Micro Processing Unit), CPU (Central Processing Unit), and the like are exemplified. As the storage unit, a memory and the like are exemplified. Note that, controller 30 may be constituted by a single controller that performs control collectively, or may be constituted by a plurality of controllers that are collaborated to perform control dispersively.

For instance, controller 30 determines an azimuth of flying object 1 relative to the north azimuth (for example, azimuth N directed upward vertically in FIG. 7) and a plan position of flying object 1, based on azimuth information and position information of flying object 1 that has been received from flying object 1 through second control communication unit 22. Note that, as shown in FIG. 7, the azimuth of flying object 1 is defined as azimuth Pa to which vertical base surface P of flying object 1 is directed. Herein, vertical base surface P is a surface passing through the central axis of flying object 1 and extending in a radial direction from the central axis. For instance, azimuth Pa is indicated by an azimuth angle relative to the north azimuth, i.e., a rotation angle. Accordingly, in controller 30, the azimuth of flying object 1 is associated with a capture-dependent image, based on the time when the capture-dependent image is captured. Furthermore, an azimuth of flying object 1 when a captured image is captured, is defined as an image-capturing azimuth of the capture-dependent image. Note that, the azimuth of flying object 1 at the time of capturing the capture-dependent image is also defined as an image-capturing azimuth of image capturing device 4. Furthermore, in the memory of controller 30, information on positions of four projectors 10a to 10d is stored in advance. In controller 30, a relative positional relationship between flying object 1 and four projectors 10a to 10d is associated with time, and determined. Based on an image-capturing azimuth of a capture-dependent image and a relative positional relationship between flying object 1 and projectors 10a to 10d, controller 30 specifies a projector (for example, any one of projectors 10a to 10d) located in the image-capturing azimuth relative to flying object 1. The projector located in the image-capturing azimuth relative to flying object 1 means a projector located closest to the image-capturing azimuth relative to flying object 1. Controller 30 causes the projector, which is located in the image-capturing azimuth relative to flying object 1, to project the corresponding capture-dependent image. Regardless of the image-capturing azimuth of the capture-dependent image, controller 30 may select any one of projectors 10a to 10d, and cause the projector to project the corresponding capture-dependent image.

Further, in controller 30, information on processing of the capture-dependent image, which has been received from terminal device 40 through first control communication unit 21, is applied to the captured image received from flying object 1, i.e., the capture-dependent image is processed based on the information. After that, controller 30 sends the processed capture-dependent image to projection device 10, and causes projection device 10 to project it. Such controller 30 may include a memory that stores a capture-dependent image temporarily, and the memory may be disposed in relay unit 50 independent from controller 30.

Controller 30 may process a capture-dependent image such that the processing contents of the capture-dependent image remains in a fixed position. Alternatively, controller 30 may process a capture-dependent image such that the processing contents of the capture-dependent image moves, for example, scrolls. When the processing contents of the capture-dependent image is moved, controller 30 processes a plurality of capture-dependent images, which are to be sent to a plurality of projectors (projectors 10a to 10d), and sends each of the plurality of capture-dependent images, which has been processed, to a corresponding one of projectors 10a to 10d.

Further, based on position information of terminal device 40, controller 30 may select any of projector 10a to 10d each projecting the processing contents of the capture-dependent image. For instance, based on a positional relationship between projectors 10a to 10d and terminal device 40, controller 30 causes a projector (for example, any one of projectors 10a to 10d) located close to, for example, closest to terminal device 40 to project the processing contents of the capture-dependent image. A user of terminal device 40 can check the processing contents of the capture-dependent image directly and visually. Herein, the above-mentioned one of projectors 10a to 10d projects the processing contents of the capture-dependent image on balloon 2 of flying object 1. Note that, the projector selected by controller 30 is not limited to a projector close to terminal device 40. For instance, controller 30 may cause any one of projectors 10a to 10d to project the processing contents of the capture-dependent image, or may cause two or more of projectors 10a to 10d to project the processing contents of the capture-dependent image.

Note that, controller 30 may cause projector 10 to project any of images, i.e., the processed image to which processing is applied through terminal device 40 as mentioned above, a processed image to which processing is applied through input unit 51, a processed image to which processing is applied through terminal device 40 and input unit 51, and a captured image to which no processing is applied through terminal device 40 and input unit 51.

2. Operation of Projection System

[2-1. Image Projecting Operation of Projection System]

Figure 8:
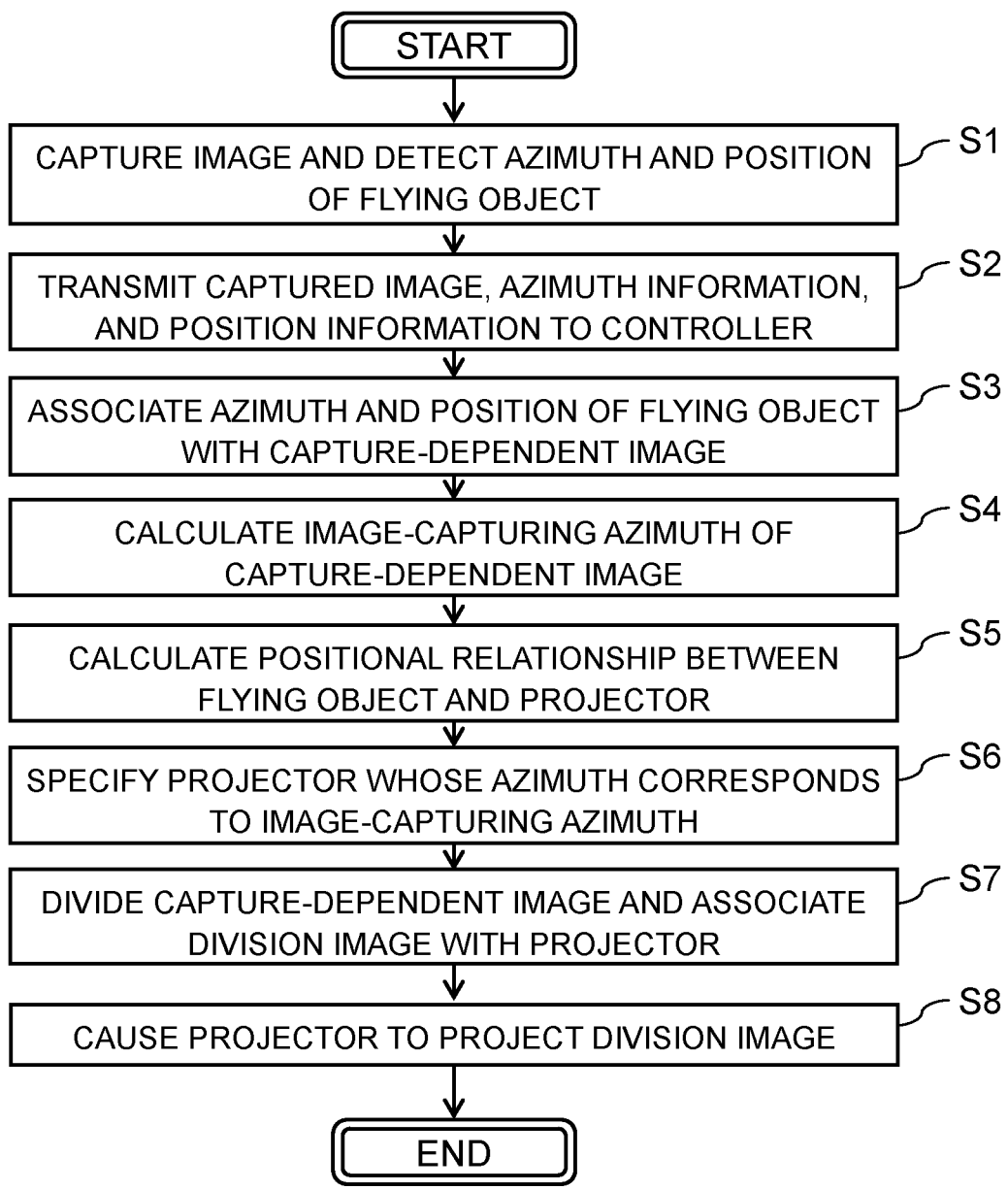
FIG. 8 is a flowchart exemplarily showing an operation flow of the projection system in accordance with the exemplary embodiment.
Figure 9:
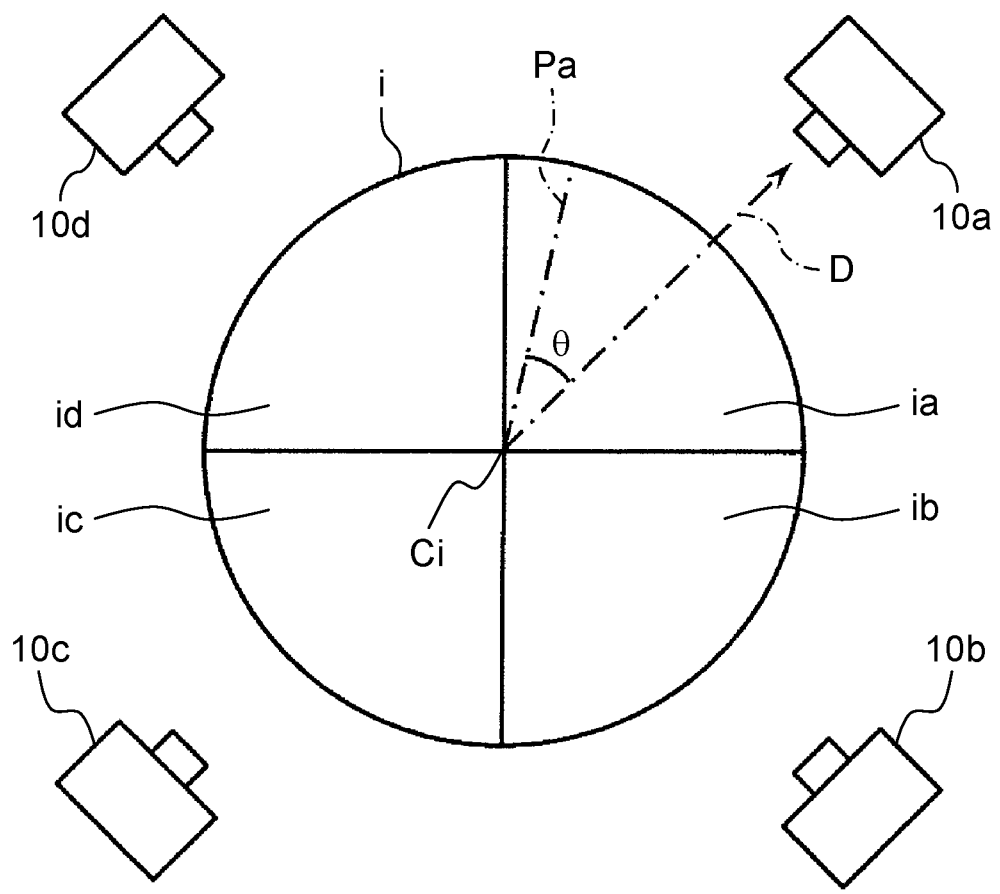
FIG. 9 is a schematic view exemplarily showing a process of dividing a captured image of an image capturing device provided in the flying object of FIG. 7.

With reference to FIGS. 6 through 9, an image-projecting operation of projection system 100 in accordance with the present exemplary embodiment will be described. Note that, FIG. 8 is a flowchart exemplarily showing a flow of the image-projecting operation of projection system 100 in accordance with the exemplary embodiment. FIG. 9 is a schematic view exemplarily showing division processing of an image captured by image capturing device 4 of flying object 1 in FIG. 7. Image capturing device 4 of flying object 1, which is located at a position inside four projectors (projectors 10a to 10d), continuously captures images over a range of 360 degrees around flying object 1. Azimuth detector 7 and position detector 8 of flying object 1 detect azimuth information and position information of flying object 1, continuously (Step S1). The azimuth information and the position information of flying object 1 are sent to controller 30 of relay unit 50 in real time, as well as the captured image of image capturing device 4 (Step S2).

Controller 30 of relay unit 50 calculates an azimuth and a position of flying object 1 from the azimuth information and the position information of flying object 1. Based on the time when the azimuth information and the position information are detected and the time when the captured image is captured, the azimuth and the position of flying object 1 are associated with the captured image, i.e., the capture-dependent image, in controller 30 (Step S3). Furthermore, based on the azimuth of flying object 1, controller 30 calculates an image-capturing azimuth of the capture-dependent image when captured (Step S4). Subsequently, from the position information of flying object 1 and the position information of projectors 10a to 10d which has been stored in advance, controller 30 calculates a relative positional relationship between flying object 1 and projectors 10a to 10d (Step S5). Based on the image-capturing azimuth of the capture-dependent image and the relative positional relationship between flying object 1 and projectors 10a to 10d, controller 30 specifies a projector (for example, any one of projectors 10a to 10d) located at a position corresponding to the image-capturing azimuth of the capture-dependent image (Step S6). For instance, at Step S6, projector 10a is assumed to be specified. Projector 10a, which is located at a position corresponding to the image-capturing azimuth of the capture-dependent image, is equivalent to projector 10a whose azimuth relative to flying object 1 is closest to the image-capturing azimuth.

Controller 30 calculates an azimuth of projector 10a that has been specified above. Based on the calculated azimuth, controller 30 divides the capture-dependent image, and then associates the divided image (division image) with projector 10a (Step S7). Specifically, based on the azimuths of projectors 10a to 10d, controller 30 divides a circle-shaped capture-dependent image into division images having the same number of projectors 10a to 10d. More specifically, the circle-shaped capture-dependent image is divided into four division images ia, ib, ic, and id along its circumferential direction about center Ci, as shown in FIG. 9. For instance, in controller 30, division image ia whose circumference has a predetermined rotation angle about center Ci relative to azimuth D of projector 10a is associated with projector 10a that has been specified at Step S6. In other words, in controller 30, capture-dependent image i is divided such that azimuth D is aligned with the center in a circumferential direction of division image ia, so that division image ia is produced. Note that, FIG. 9 shows an example in which the predetermined rotation angle, mentioned above, has an angle of 90 degrees. Division images ia, ib, ic, and id are also images formed by dividing capture-dependent image i in accordance with a viewing angle of image capturing device 4. Division images ia, ib, ic, and id each display an area ranging from a lower part to a partial surrounding of flying object 1. The image-capturing azimuths of division images ia, ib, ic, and id correspond to azimuths of projectors 10a, 10b, 10c and 10d relative to flying object 1, respectively. Note that, each of the image-capturing azimuths of division images ia to id is an azimuth extending from center Ci of capture-dependent image i to a central position of the circumference of a corresponding one of division images ia to id.

In the present example, azimuth D is inclined at an angle of θ with respect to azimuth Pa of flying object 1, i.e., rotated from azimuth Pa by only an angle of θ about a central axis of flying object 1. For this reason, the image-capturing azimuth of division image ia, which serves as azimuth D, is shifted from the azimuth of capture-dependent image i, which serves as azimuth Pa, by only an angle of θ. If the angle is less than 45 degrees, i.e., a half of 90 degrees, azimuth Pa of flying object 1 and the azimuth of projector 10a will be considered to correspond to each other. Therefore, image-capturing azimuths of division images ia, ib, ic, and id correspond to the azimuths of projectors 10a 10b, 10c, and 10d relative to flying object 1, respectively. In the present exemplary embodiment, since flying object 1 is located at the center of an area surrounded by projectors 10a to 10d, division images ia to id are obtained by dividing capture-dependent image i equally in its circumferential direction. In accordance with the relative positional relationship between flying object 1 and projectors 10a to 10d, division images ia to id may be changed in shape.

Controller 30 sends a signal to each of projectors 10a to 10d such that each of projectors 10a to 10d projects a corresponding one of division images ia to id, and then causes each of projectors 10a to 10d to project the corresponding one of division images ia to id (Step S8). At this time, the corresponding one of division images ia to id, which has a fan-like shape, is expanded into a rectangular shape and projected on balloon 2 of flying object 1. For instance, FIG. 10 shows the state where division images ib and ic are projected on balloon 2 by projectors 10b and 10c.

Figure 10:
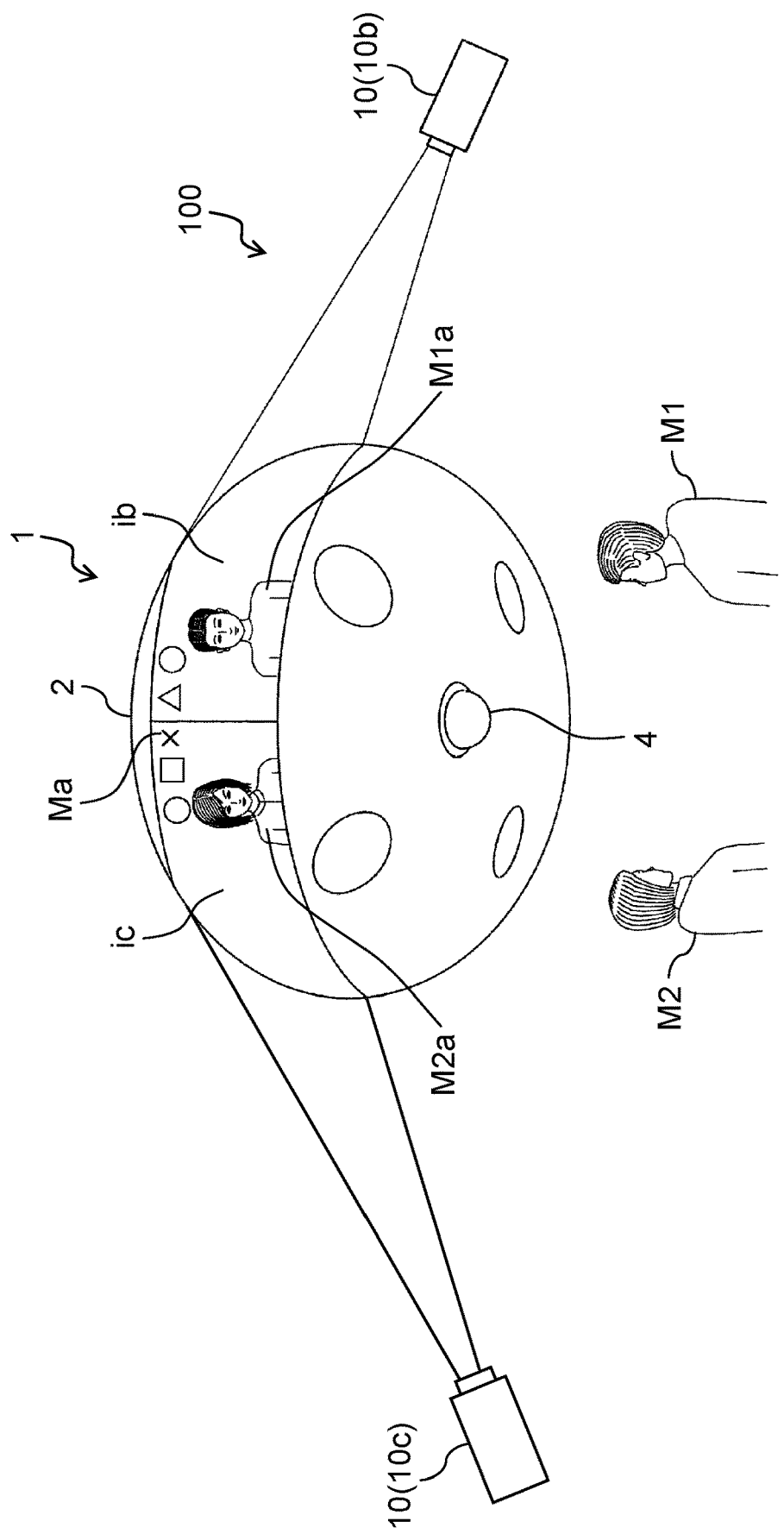
FIG. 10 is a perspective view exemplarily showing the state where the divided images in FIG. 9 are projected on the flying object.

FIG. 10 is a perspective view exemplarily showing the state where division images ib and ic in FIG. 9 are projected to flying object 1. At this time, controller 30 may cause projectors 10a to 10d to project division images ia to id, respectively, without any processing. Alternatively, controller 30 may cause projectors 10a to 10d to project processed division images ia to id, respectively. Herein, the processed division images ia to id are formed by applying processing, such as decoration, animation processing, and addition and modification of characters or the like, to division images ia to id. Such processing may be performed through input unit 51 of relay unit 50, or may be performed through terminal device 40 as described later. Controller 30 causes projectors 10a to 10d to project the capture-dependent images that are constituted by above-mentioned division images ia to id. The capture-dependent images constituted by division images ia to id may be projected to balloon 2 individually, or may be combined with one another to be projected.

With respect to the process at Step S1, processes at Steps S2 to S8 are performed in real time, thereby making it possible to project the captured image of image capturing device 4 or the capture-dependent image on balloon 2 in real time. Furthermore, using division images ia to id, the images displaying an area around flying object 1 are projected on an exterior surface of balloon 2 over the entire external circumference of balloon 2. Such images projected on balloon 2 are configured to display an area that is located away from the central axis of balloon 2 and faces balloon 2. Therefore, if person M1 and person M2 are located around flying object 1, the images of person M1 and person M2 will be projected on balloon 2 when person M1 and person M2 look at balloon 2, as shown in FIGS. 7 and 10. For instance, if person M1 is located near projector 10b and faces division image ib projected on balloon 2, person M1 can catch one's own appearance M1a displayed in division image ib. If person M2 is located near projector 10c and faces division image ic projected on balloon 2, person M2 can catch one's own appearance M2a displayed in division image ic. Therefore, these images are projected on the exterior surface of balloon 2 such that these people, which are located around flying object 1, can catch their own appearances, thereby making it possible to achieve entertaining rendition effects of flying object 1, which includes interactive operation of flying object 1.

[2-2. Projection Operation of Image Processing Contents by Projection System]

Figure 11:
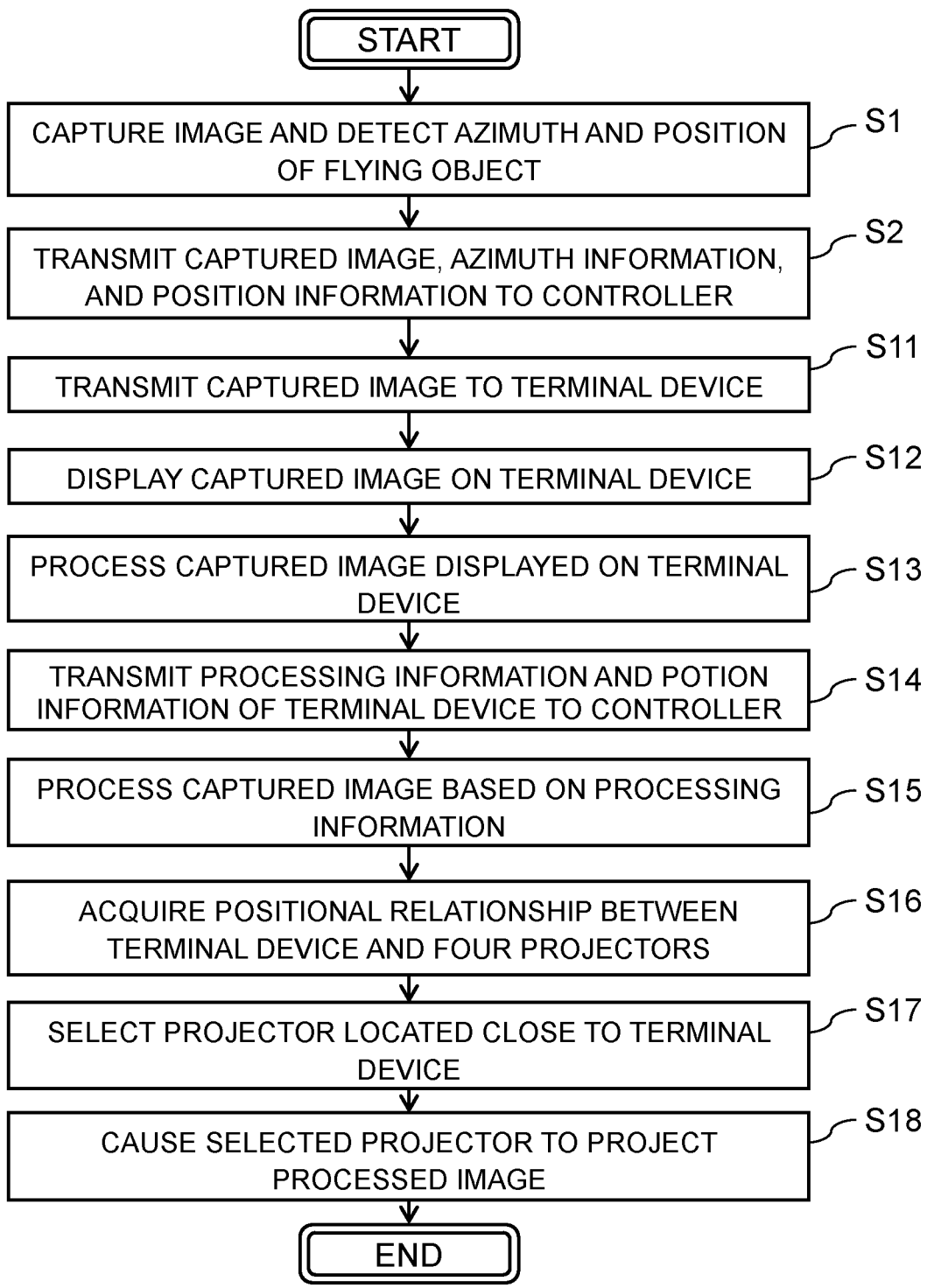
FIG. 11 is a flowchart exemplarily showing an operation flow in which the projection system in accordance with the exemplary embodiment projects image-processing contents.

With reference to FIG. 11, projection operation of image-processing contents by projection system 100 in accordance with the present exemplary embodiment will be described. Specifically, in the present operation, projection device 10 projects a processed image, which is formed by applying processing to a captured image of image capturing device 4 of flying object 1, to balloon 2 of flying object 1 as a capture-dependent image. FIG. 11 is a flowchart exemplarily showing an operation flow in which projection system 100 in accordance with the exemplary embodiment projects image-processing contents.

First, an image captured by image capturing device 4 is sent to controller 30 of relay unit 50 in real time (Steps S1 and S2). Controller 30 of relay unit 50 sends the received image to terminal device 40 in real time (Step S11). For instance, controller 30 may send the captured image to terminal device 40, while causing a memory to memorize the captured image temporarily, i.e., while causing a buffer to store the captured image temporarily. The captured image may be transmitted through streaming, for example.

Subsequently, terminal device 40 displays the received image on display 43 in real time (Step S12). A user of terminal device 40 uses input unit 42 to apply processing to the captured image displayed on display 43 (Step S13). At this time, the user can perform the processing on display 43, while checking an effect of the processing on the captured image. The user operates terminal device 40 to send the processing contents, which is applied to the captured image, to relay unit 50. At the same time, terminal device 40 sends self-position information, which is detected by terminal position detector 44, to relay unit 50. Thus, processing information, i.e., information on the processing applied to the captured image and the position information of terminal device 40 are sent to controller 30 of relay unit 50 (Step S14). As mentioned above, the processing information may be transmitted through an input operation of a user, or may be transmitted by terminal device 40 automatically.

When receiving the processing information, controller 30 processes the captured images stored in the buffer, based on the processing information (Step S15). In the present exemplary embodiment, among the captured images stored in the buffer, controller 30 processes a captured image corresponding to the processing information based on the processing information. Note that, the captured image corresponding to the processing information is the same as the captured image that has been processed in terminal device 40 based on the processing information. Another processing may be applied to the above-mentioned captured image, which is considered to be the same. Note that, it is not necessary that the processing information and the captured image correspond to each other. For instance, after receiving processing information, controller 30 may apply processing to the captured image received from image capturing device 4, based on the processing information.

Subsequently, controller 30 selects projectors 10a to 10d that project a capture-dependent image obtained by processing the captured image. Specifically, controller 30 determines a relative positional relationship between terminal device 40 and four projectors (projectors 10a to 10d), based on the position information of terminal device 40 received at Step S14 and the position information of projectors 10a to 10d stored in the memory (Step S16). Note that, when receiving new position information of terminal device 40 after the position information of terminal device 40 has been received, controller 30 may update the position information of terminal device 40.

Controller 30 selects a projector (for example, any one of projectors 10a to 10d) located close to terminal device 40 as a projector that projects the processed capture-dependent image (Step S17). At this time, controller 30 may select a projector located closest to terminal device 40, i.e., a projector whose horizontal distance from terminal device 40 is shortest, for example. Alternatively, controller 30 may determine an azimuth of terminal device 40 relative to flying object 1, based on a positional relationship between flying object 1 and terminal device 40. Controller 30 may select a projector whose azimuth relative to flying object 1 is closest to the azimuth of terminal device 40 relative to flying object 1 from among projectors 10a to 10d. In other words, the position closest to terminal device 40 may be selected based on an azimuth, or may be selected based on a horizontal distance. For instance, as shown in FIG. 7, if terminal device 40 is located close to projector 10b, controller 30 will select projector 10b.

Note that, if the processing information includes moving of the processing contents, controller 30 may select a plurality of projectors (two or more of projectors 10a to 10d)

as a projector that projects the processed capture-dependent image. For instance, as shown in FIGS. 9 and 10, if content Ma is scrolled around balloon 2 ranging from division image is to division image id, controller 30 may select all of projectors 10a to 10d and determine the order in which controller 30 causes projectors 10a to 10d to project the processing contents.

Controller 30 sends data of the processed capture-dependent image to the selected projectors 10a to 10d, and causes the selected projectors 10a to 10d to project the capture-dependent image on balloon 2 of flying object 1 (Step S18). Thus, a user of terminal device 40 can recognize the processed capture-dependent image visually in one's gaze direction, when looking at balloon 2. Therefore, a user of terminal device 40 can recognize a modification of the captured image, which is applied by the user, visually on an exterior surface of balloon 2, thereby making it possible to achieve entertaining rendition effects of flying object 1.

Note that, in the above description, it is exemplified that one terminal device 40 is disposed in projection system 100. However, a plurality of terminal devices 40 may be disposed. In this case, controller 30 may receive processing information from each of the plurality of terminal devices 40, and process a capture-dependent image based on the processing information received from the plurality of terminal devices 40. Furthermore, controller 30 may reflect all pieces of multiple processing information on one capture-dependent image. Alternatively, controller 30 may divide multiple processing information into some pieces. Each piece of the divided processing information may be reflected on a corresponding one of a plurality of capture-dependent images such as a division image, for example. In the latter case, controller 30 may receive each piece of position information from a corresponding one of a plurality of terminal devices 40, and cause a projector (for example, any one of projectors 10a to 10d) located close to the corresponding one of the plurality of terminal devices 40 to project the capture-dependent image on which the processing information of the corresponding one of the plurality of terminal devices 40 is reflected.

Further, the order in which projection system 100 projects the image-processing contents may not be limited to the above description. The order of processes at Steps may be changed. For instance, after performing processes at Steps S16 and S17, i.e., selecting any one of projectors 10a to 10d that projects the capture-dependent image including the processing information, controller 30 may perform the process at Step S15, i.e., may process the captured image, which is to be projected by the selected projector (any one of projectors 10a to 10d). Thus, when the plurality of projectors 10a to 10d project different images such as division images is to id, effective processing can be performed by controller 30.

3. Effects

In one aspect of the present disclosure, projection system 100 may not be allowed to communicate with terminal device 40. Projection system 100 in accordance with the exemplary embodiment include flying object 1, projection device 10, and controller 30. Flying object 1 has balloon 2, flying device 3 that causes balloon 2 to fly, and image capturing device 4. Projection device 10 projects a capture-dependent image, which depends on an image captured by image capturing device 4, to balloon 2. Controller 30 causes projection device 10 to project the capture-dependent image. The capture-dependent image may be at least either of an image captured by image capturing device 4 or a processed image formed by applying processing to the captured image. Any processing may be applied to the captured image.

In accordance with the above-mentioned configuration, a person around flying object 1 can enjoy watching a capture-dependent image of image capturing device 4 on balloon 2 of flying object 1. Herein, flying object 1 is equipped with image capturing device 4. Furthermore, a person around a flying object can see surrounding states of the flying object from its own view point, i.e., can enjoy watching images from another view point different from one's own eyes. Still furthermore, when image capturing device 4 captures a person around flying object 1, the person around flying object 1 can enjoy watching one's own image projected on balloon 2. This makes it possible for flying object 1 to achieve characteristic rendition effects. Note that, in the above-mentioned configuration, projection device 10 may be disposed outside flying object 1, or may be disposed in flying object 1.

Further, in another aspect of the present disclosure, projection system 100 in accordance with the exemplary embodiment is allowed to communicate with terminal device 40. In other words, projection system 100 includes first control communication unit 21 that communicates with terminal device 40. Further, first control communication unit 21 receives information that has been inputted to terminal device 40 through terminal communication unit 41 of terminal device 40. Controller 30 processes a captured image of image capturing device 4 into a processed image, based on the information that has been received by first control communication unit 21, and causes projection device 10 to project the processed image. In the above-mentioned configuration, by inputting information to terminal device 40, a person around flying object 1 can enjoy watching, on balloon 2, the processed image on which the input information is reflected. For instance, when a plurality of terminal devices 40 are operated by a plurality of persons, the plurality of persons can communicate with one another through the processed image projected on balloon 2. This makes it possible for flying object 1 to achieve various kinds of characteristic rendition effects. Note that, in another aspect of the present disclosure, a captured image is processed through input unit 42 of terminal device 40, but not limited to this. In one aspect of the present disclosure and another aspect of the present disclosure, a captured image may be processed through devices other than terminal device 40, such as projection device 10, flying object 1, relay unit 50, and maneuver 1a.

In one aspect and another aspect of the present disclosure, projection system 100 further includes azimuth detector 7 that is disposed in flying object 1 and detects an azimuth of flying object 1. Further, projection device 10 has a plurality of projectors (projectors 10a to 10d). Controller 30 determines an azimuth in which the capture-dependent image is captured, i.e., an image-capturing azimuth of the capture-dependent image from azimuth information of flying object 1 detected by azimuth detector 7. Further, based on a positional relationship between flying object 1 and projectors 10a to 10d, controller 30 selects any one of projectors 10a to 10d whose azimuth relative to flying object 1 corresponds to the image-capturing azimuth, and causes the projector to project the capture-dependent image.

In accordance with the above-mentioned aspect, the capture-dependent image captured in the image-capturing azimuth is projected on balloon 2 from any one of projectors 10a to 10d whose azimuth corresponds to the image-capturing azimuth. Thus, if a person is located around flying object 1, one's own image will be projected on an exterior surface of balloon 2 that faces the person around flying object 1. Accordingly, the person around flying object 1 can see one's own image on a buffering body. This makes it possible for the flying object to improve its rendition effects.

In one aspect and another aspect of the present disclosure, image capturing device 4 has a wide viewing angle, for example, a viewing angle of 360 degrees. Controller 30 divides capture-dependent image i to form division images ia to id. Controller 30 determines each of image-capturing azimuths of division images ia to id from azimuth information of flying object 1. In controller 30, division images ia to id are associated with projectors 10a to 10d, respectively, based on the image-capturing azimuths of division images ia to id and positions of projectors 10a to 10d. Controller 30 causes each of projectors 10a to 10d to project a corresponding one of division images ia to id. At this time, controller 30 may divide capture-dependent image i along the viewing angle of image capturing device 4.

Herein, like a capture-dependent image having a viewing angle of 360 degrees, if a capture-dependent image with a wide viewing angle is developed along its viewing angle, the capture-dependent image will be elongated remarkably. To project such a capture-dependent image, balloon 2 serving as a screen is also needed to have a wide width. In the above-mentioned configuration, a capture-dependent image is divided into division images along the viewing angle. Therefore, the capture-dependent image can be projected on an exterior surface of balloon 2 over a wide area, even if balloon 2 is not enough to be elongated. In other words, an influence of a shape and size of balloon 2 on the capture-dependent image can be reduced. Furthermore, the division images, rather than one image having a wide viewing angle, are used to project the capture-dependent image, thereby making it possible to reduce deformation or missing of the image projected on balloon 2 including a curved surface. Thus, a captured image with a wide viewing angle or the entire processed image can be projected on balloon 2 clearly.

Further, in the above-mentioned aspect, controller 30 causes projectors 10a to 10d whose azimuths relative to flying object 1 correspond to image-capturing azimuths of division images ia to id to project division images ia to id. Thus, division images ia to id, which capture a person around flying object 1, are projected on an exterior surface of balloon 2 that is located to face the person around flying object 1. Therefore, the person around flying object 1 can enjoy watching one's own image on balloon 2.

Further, in one aspect and another aspect of the present disclosure, second control communication unit 22, controller 30, and projection device 10 are disposed apart from flying object 1. Second control communication unit 22 receives a capture-dependent image from flying object communication unit 5 of flying object 1, and sends it to controller 30. In the above-mentioned configuration, whatever structure balloon 2 has, projection device 10 can project a captured image of image capturing device 4 and a processed image thereof on an exterior surface of balloon 2 from the outside. For instance, regardless of whether balloon 2 is configured to pass through light or not, projection device 10 can project the capture-dependent image on balloon 2. Further, projection device 10 is not mounted in flying object 1. Therefore, projection device 10 does not affect the flying object and its flight, thereby enabling application for various kinds of projection devices, and also enabling weight saving of flying object 1.

In one aspect and another aspect of the present disclosure, flying device 3 has a plurality of rotor units 3a, and balloon 2 is a bag-like body that covers the plurality of rotor units 3a. In the above-mentioned structure, balloon 2 can be filled with gas, because having a bag-like body. Further, if a gas whose specific gravity is smaller than that of air is employed, flying device 3 will have buoyant, thereby making it possible to reduce consumption energy of flying device 3. Furthermore, flying device 3 constituted by rotor units 3a facilitates flying operation such as hovering or slightly moving of flying object 1. Still furthermore, since a plurality of rotor units 3a are provided, flying object 1 can achieve various kinds of operations such as moving and hovering, while stabilizing its posture.

In another aspect of the present disclosure, controller 30 causes a projector (for example, any one of projectors 10a to 10d) located close to terminal device 40 to project a processed image, based on position information of terminal device 40 and position information of a plurality of projectors 10a to 10d. In the above-mentioned configuration, a user of terminal device 40 can easily see the processed image projected by the projector (for example, any one of projectors 10a to 10d) located close to terminal device 40. Therefore, by using terminal device 40, the user of terminal device 40 can process the above-mentioned image, while checking the processed image on balloon 2.

In another aspect of the present disclosure, controller 30 causes a projector (for example, any one of projectors 10a to 10d) located close to terminal device 40 to project a processed image, based on a terminal device azimuth and a projection device azimuth. Herein, the terminal device azimuth serves as an azimuth of terminal device 40 relative to flying object 1, and the projection device azimuth serves as a corresponding one of azimuths of a plurality of projectors 10a to 10d relative to flying object 1. In the above-mentioned configuration, a projector whose azimuth relative to flying object 1 is close to the azimuth of terminal device 40 projects the processed image to a direction in which the user of terminal device 40 watches balloon 2. Therefore, the user of terminal device 40 can check the processed image on balloon 2 near one's own front.

In another aspect of the present disclosure, controller 30 sends a captured image of image capturing device 4 to terminal device 40. In the above-mentioned configuration, if display 43 is mounted in terminal device 40, terminal device 40 can display the received captured image on display 43. Accordingly, a user of terminal device 40 can input information, such as processing information, to terminal device 40, while checking the image displayed on display 43. The input information may be sent to controller 30 automatically in real time, or may be sent to controller 30 in response to the user's instructions of terminal device 40. In the latter case, after an effect of input information on the processed image is checked on display 43, the user of terminal device 40 can send the information to controller 30, for example.

Further, flying objects 1 in accordance with one aspect and another aspect of the present disclosure are provided in projection systems 100 in accordance with the above-mentioned aspect and another aspect, respectively. In other words, flying object 1 includes image capturing device 4, balloon 2, and flying device 3 that causes balloon 2 to fly. A capture-dependent image that depends on an image captured by image capturing device 4 is projected on balloon 2. In the above-mentioned configuration, flying object 1 can be used as a screen to project the image captured by image capturing device 4 included in flying object 1, and a processed image thereof.

Further, flying object systems 101 in accordance with one aspect and another aspect of the present disclosure each include flying object 1 and controller 30 provided in projection systems 100 in accordance with the above-mentioned aspect and another aspect. In other words, flying object system 101 includes flying object 1 and controller 30. Flying object 1 has image capturing device 4, balloon 2 on which a capture-dependent image, which depends on an image captured by image capturing device 4, is projected, and flying device 3 that causes balloon 2 to fly. In controller 30, a signal for projecting the capture-dependent image on balloon 2 is outputted to projection device 10. In the above-mentioned configuration, it is assumed that flying object system 101 and a general-purpose projection device are prepared. If the captured image of flying object system 101 and a processed image thereof are projected by using the general-purpose projection device, the same configuration and function as projection system 100 will be achieved. Accordingly, in flying object system 101, projection device 10 dedicated to flying object system 101 is not necessary, which has flexibility.

Further, in one aspect and another aspect of the present disclosure, a projection method causes projection device 10 to project a capture-dependent image of image capturing device 4 to balloon 2 of flying object 1 including image capturing device 4.

Furthermore, in one aspect and another aspect of the present disclosure, a projection method sends a capture-dependent image of image capturing device 4 to projection device 10 from flying object 1 through wireless communications.

Further, in one aspect and another aspect of the present disclosure, based on a positional relationship between a plurality of projectors 10a to 10d and flying object 1, a projection method determines a projector (for example, any one of projectors 10a to 10d) whose azimuth relative to flying object 1 corresponds to an image-capturing azimuth of an image captured by image capturing device 4 from among the plurality of projectors 10a to 10d. After that, the projection method causes the determined projector to project the image captured in the image-capturing azimuth, and a processed image thereof.

Furthermore, in one aspect and another aspect of the present disclosure, in accordance with information received from terminal device 40, a projection method processes an image captured by image capturing device 4 of flying object 1 into a processed image. And then, the projection method causes projection device 10 to project the above-mentioned processed image to balloon 2 of flying object 1.

Still furthermore, in one aspect and another aspect of the present disclosure, a projection method sends at least one of a captured image of image capturing device 4 or a processed image thereof to projection device 10 from flying object 1 through wireless communications, and acquires information from terminal device 40 through wireless communications. Note that, the configuration that sends the processed image to projection device 10 from flying object 1 through wireless communications will be described in the following as a modification of the projection system.

Further, in one aspect and another aspect of the present disclosure, based on a positional relationship between a plurality of projectors (projectors 10a to 10d) and terminal device 40, a projection method causes a projector (for example, any one of projectors 10a to 10d) located close to terminal device 40 to project a processed image on which input information is reflected.

The above-mentioned methods in one aspect and another aspect of the present disclosure can obtain the same effects as the above-mentioned effects of projection system 100 in accordance with one aspect and another aspect of the present disclosure. The above-mentioned methods in one aspect and another aspect of the present disclosure may be achieved by circuits such as a MPU (Micro Processing Unit), a CPU (Central Processing Unit), a processor, and an LSI (Large Scale Integration). Furthermore, the methods may be achieved by an IC (Integrated Circuit) card or a stand-alone module.

Other Exemplary Embodiments

As mentioned above, the above-mentioned exemplary embodiment has been described as an example of the technique in the present disclosure. However, the technique in the present disclosure is not limited to this. The technique can also be applied to exemplary embodiments in which modifications, substitutions, additions, omission, and the like are performed as necessary. Further, structural components described in the above-mentioned exemplary embodiment and the following other exemplary embodiments can also be combined to form a new exemplary embodiment. Hereinafter, other exemplary embodiments will be described.

Figure 12:
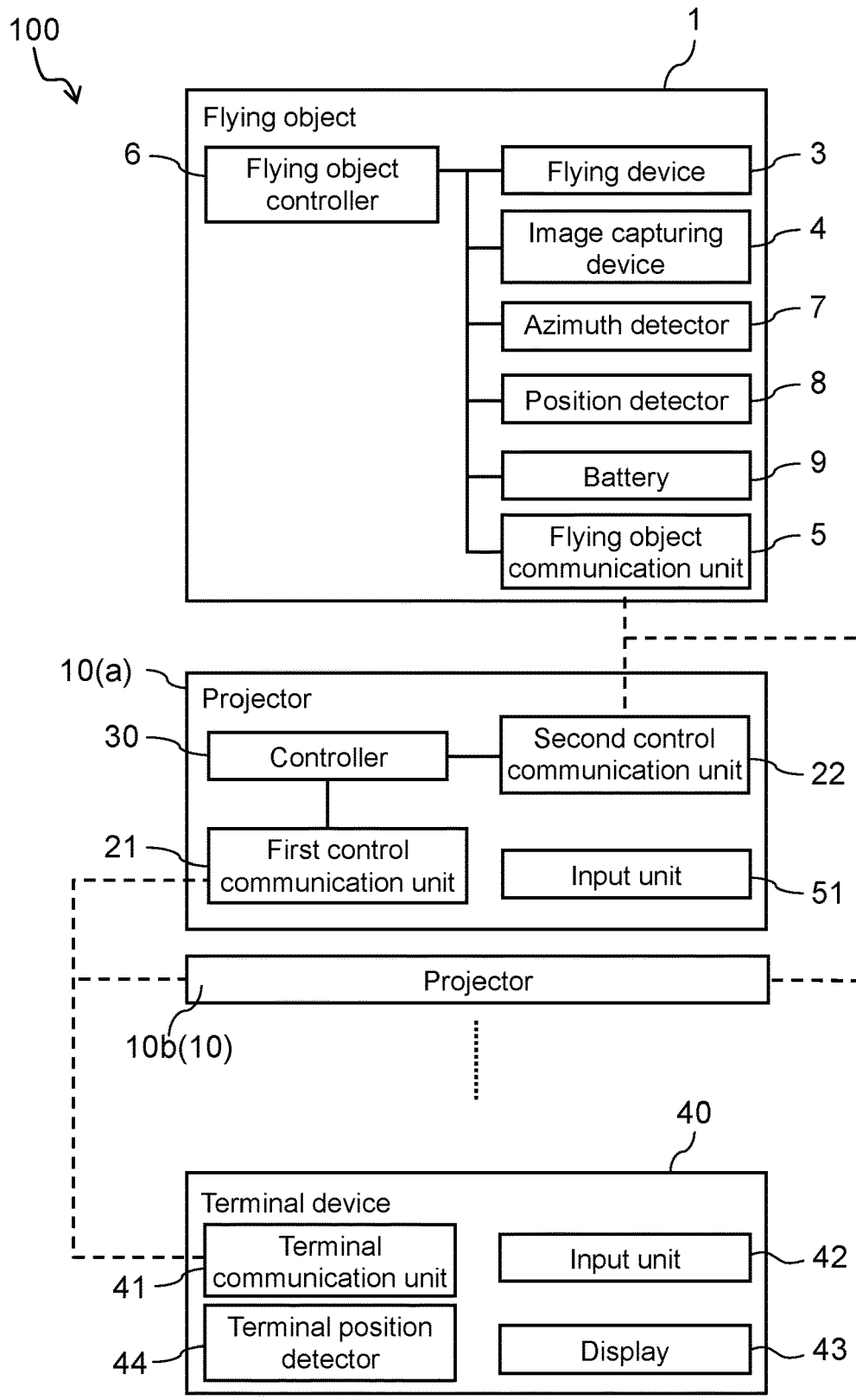
FIG. 12 is a block diagram showing a schematic configuration of a projection system in accordance with a modification of the exemplary embodiment.
Figure 13:
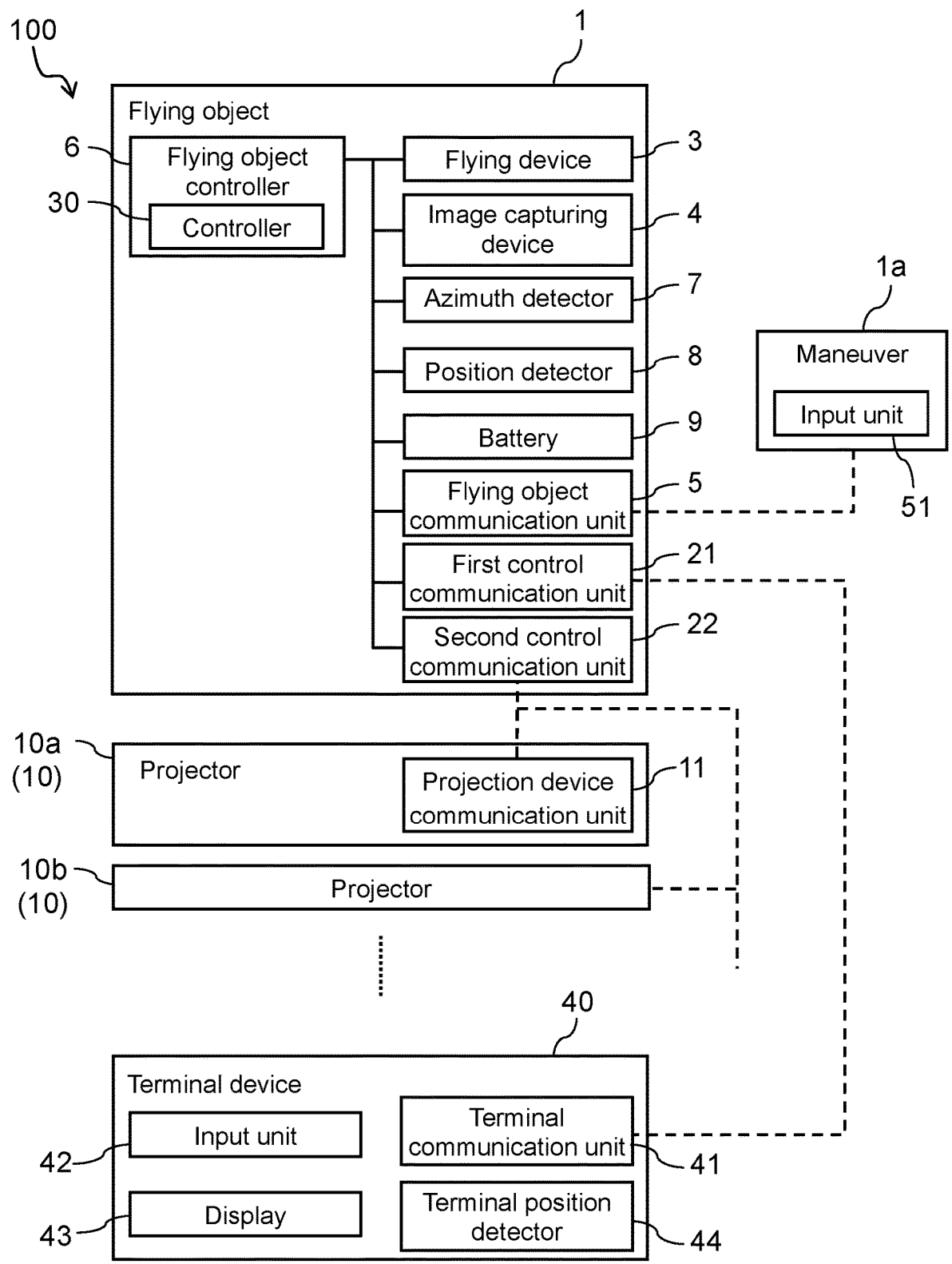
FIG. 13 is a block diagram showing a schematic configuration of a projection system in accordance with another modification of the exemplary embodiment.

In projection system 100 in accordance with the exemplary embodiment, controller 30 is disposed in relay unit 50 provided apart from flying object 1 and projection device 10, but not limited to this. Controller 30 may be disposed in projection device 10, or may be disposed in flying object 1. FIG. 12 shows an example in which controller 30 is disposed in projection device 10. FIG. 13 shows an example in which controller 30 is disposed in flying object 1. Note that, FIG. 12 is a block diagram showing a schematic configuration of a projection system in accordance with a modification of the exemplary embodiment. FIG. 13 is a block diagram showing a schematic configuration of a projection system in accordance with another modification of the exemplary embodiment.

In the example of FIG. 12, controller 30, first control communication unit 21, and second control communication unit 22 are mounted in each of projectors 10a to 10d. Controller 30 may perform projection control of projection device 10, or may not perform the projection control. Second control communication unit 22 communicates with flying object communication unit 5 of flying object 1, wirelessly. First control communication unit 21 communicates with terminal device 40. The operation of controller 30 and second control communication unit 22 is the same as that of projection system 100 in accordance with the exemplary embodiment. With the above-mentioned configuration, relay unit 50 can be eliminated, so that a configuration of the projection system can be simplified. Input unit 51 of relay unit 50 may be disposed in each of projectors 10a to 10d, or may be configured as a part of input device of projectors 10a to 10d.

In the example of FIG. 13, controller 30, first control communication unit 21, and second control communication unit (third communication unit) 22 are mounted in flying object 1. Controller 30 may perform flight control, which is performed by flying object controller 6 of flying object 1, or may not perform the flight control. Projection device communication unit 11 is disposed in each of projectors 10a to 10d. Projection device communication unit 11 wirelessly communicates with the second control communication unit 22 of flying object 1 to receive a capture-dependent image, which includes a captured image of image capturing device 4 and a processed image thereof, from second control communication unit 22 and introduce it to projection device 10. Thus, controller 30 of flying object 1 communicates with each of projectors 10a to 10d, wirelessly, through second control communication unit 22 and projection device communication unit 11. First control communication unit 21 communicates with terminal device 40. Like the wireless communication between flying object communication unit 5 and second control communication unit 22 of projection system 100 in accordance with the exemplary embodiment, wireless communications can be applied to the communication between second control communication unit 22 and projection device communication unit 11. With the above-mentioned configuration, relay unit 50 can be eliminated, so that a configuration of the projection system can be simplified. Further, controller 30 is not necessary to dispose in projection device 10. Furthermore, controller 30 is not necessary to dispose in devices other than flying object 1 and independent from projection device 10. This makes it possible to simplify structural components other than flying object 1 in the projection system. Further, a general-purpose projection device can be applied as projection device 10. Input unit 51 of relay unit 50 may be disposed in maneuver 1a of flying object 1, or may be disposed in flying object 1. In this case, information is inputted to input unit 51 of maneuver 1a, and then sent to flying object 1 through flying object communication unit 5. Note that, first control communication unit 21 and second control communication unit 22 may be configured as a part of flying object communication units 5, or may be provided apart from flying object communication unit 5.

In projection system 100 in accordance with the exemplary embodiment, controller 30 of relay unit 50 reflects processing information on a capture-dependent image, but not limited to this. Flying object 1 may reflect the processing information thereon, or projection device 10 may reflect the processing information thereon.

In projection system 100 in accordance with the exemplary embodiment, controller 30 calculates an azimuth of flying object 1, a positional relationship between flying object 1 and projection device 10, and a positional relationship between flying object 1 and terminal device 40, but not limited to this. Flying object controller 6 of flying object 1 may calculate a direction, a position, and the like related to flying object 1.

In projection system 100 in accordance with the exemplary embodiment, four projectors (projectors 10a to 10d) are disposed with respect to one flying object 1, but the number of projectors is not limited to this. One or more projectors may be disposed.

In projection system 100 in accordance with the exemplary embodiment, one capture-dependent image, i.e., an image captured by one image capturing device 4 mounted in one flying object 1 is projected on balloon 2 of above-mentioned one flying object 1, but not limited to this. Two or more capture-dependent images, i.e., images captured by a plurality of image capturing devices mounted in one flying object 1 may be projected on balloon 2 of above-mentioned one flying object 1. Alternatively, a capture-dependent image, i.e., an image captured by an image capturing device mounted in at least one of two or more flying objects 1 may be projected on balloons 2 of above-mentioned two or more flying objects 1. In the case where two or more capture-dependent images are captured by a plurality of image capturing devices, the above-mentioned two or more capture-dependent images may be projected individually, or may be combined to be projected.

Further, in projection system 100 in accordance with the exemplary embodiment, position detector 8 can detect position information of flying object 1. Therefore, a focus and size of the capture-dependent image may be changed in accordance with a distance between projection device 10 and flying object 1. Thus, the rendition effects can be improved more.

In flying object 1 of projection system 100 in accordance with the exemplary embodiment, four rotor units 3a are disposed in one balloon 2, but not limited to this. One or more rotor units 3a may be disposed in one balloon 2.

In flying object 1 of projection system 100 in accordance with the exemplary embodiment, four rotor units 3a, i.e., flying device 3 is covered with balloon 2, but not limited to this. Flying device 3 may not covered with a buffering body such as a balloon. For instance, the buffering body may be attached to flying device 3 directly or indirectly, or may be disposed therein. Further, in the case where flying device 3 is covered with a buffering body, the entirety of flying device 3 may be covered with a buffering body, like the exemplary embodiment, or a part of flying devices 3 may be covered with a buffering body.

Further, in the exemplary embodiment, a buffering body (balloon 2) is employed as an exterior body, thereby making it possible to reduce a shock to a person when flying object 1 falls down. However, the exterior body is not limited to a buffering body. The exterior body may be formed of a hard film. Even such as exterior body can achieve high rendition effects like the exemplary embodiment.

Further, in the exemplary embodiment, projection system 100 is allowed to communicate with terminal device 40, thereby enabling a person around flying object 1 to process a capture-dependent image through terminal device 40, so that rendition effects can be more improved. However, even if projection system 100 is not allowed to communicate with terminal device 40, i.e., even if projection system 100 is not allowed to process a capture-dependent image through terminal device 40, projection system 100 can obtain rendition effects by projecting an image captured from flying object 1 on balloon 2. Further, the capture-dependent image can also be processed through devices (for example, relay device 50, maneuver 1a, flying object 1) other than terminal device 40.

The exemplary embodiments are described above as the examples of the technique in the present disclosure. For this purpose, the accompanying drawings and the detailed description are provided. Accordingly, the components described in the accompanying drawings and the detailed description may include not only components essential for solving the problem but also components that are not essential for solving the problem in order to illustrate the technique. Therefore, even when the unessential components are described in the accompanying drawings and the detailed description, they do not have to be recognized as being essential. Further, since the above exemplary embodiments illustrate the technique in the present disclosure, various modifications, substitutions, additions and omission can be performed within the scope of claims and equivalent scope of claims.

INDUSTRIAL APPLICABILITY

As described above, the present disclosure is useful for rendition that projects an image on a flying object.

What is claimed is:
1. A projection system comprising:
a flying object having an exterior body, a flying device that causes the exterior body to fly, and an image capturing device that captures an image;

a projection device that projects a capture-dependent image on the exterior body, the capture-dependent image depending on the image; and a controller that causes the projection device to project the capture-dependent image, wherein the flying object further has an azimuth detector that detects an azimuth of the flying object, and the projection device includes a plurality of projectors disposed in different positions, and wherein:

from azimuth information of the flying object detected by the azimuth detector, the controller determines an image-capturing azimuth in which the capture-dependent image is captured, and based on a positional relationship between the flying object and the plurality of projectors, the controller causes any one of the plurality of projectors whose azimuth relative to the flying object corresponds to the image-capturing azimuth to project the capture-dependent image.

2. The projection system according to claim 1, further comprising:

a first communication unit disposed in the flying object; and a second communication unit that communicates with the first communication unit, receives data of the image from the first communication unit, and sends the data to the controller, wherein the second communication unit, the controller, and the projection device are disposed apart from the flying object.

3. The projection system according to claim 2, further comprising:

a third communication unit that communicates with the first communication unit, receives data of the image from the first communication unit, and sends the data to the projection device, wherein the third communication unit and the projection device are disposed apart from the flying object, and the controller is disposed in the flying object and communicates with the projection device through the first communication unit and the third communication unit.

4. The projection system according to claim 1, wherein the image capturing device has a wide viewing angle, and the controller:

divides the capture-dependent image to form a plurality of division images;

determines image-capturing azimuths of the plurality of division images from the azimuth information of the flying object; and associates each of the plurality of division images with a corresponding one of the plurality of projectors based on the image-capturing azimuths of the plurality of division images and positions of the plurality of projectors relative to the flying object, and causes the corresponding one of the plurality of projectors to project each of the plurality of division images.

5. The projection system according to claim 4, wherein the image capturing device has a viewing angle of 360 degrees, wherein based on the viewing angle of the image capturing device, the controller divides the capture-dependent image to form the plurality of division images.

6. The projection system according to claim 1, wherein the flying device has a plurality of rotor units each having a propeller and a motor that drives the propeller, and the exterior body is a bag-like body that covers the plurality of rotor units.

7. A projection method of projecting an image on an exterior body of a flying object, the flying object having the exterior body, a flying device that causes the exterior body to fly, and an image capturing device, the projection method comprising:

causing a projection device to project a capture-dependent image on the exterior body, the capture-dependent image depending on an image captured by the image capturing device, detecting azimuth information of the flying object;

from the azimuth information, determining an image-capturing azimuth in which the capture-dependent image is captured;

based on a positional relationship between the flying object and a plurality of projectors included in the projection device and disposed in different positions, determining a projector whose azimuth relative to the flying object corresponds to the image-capturing azimuth from the plurality of projectors; and causing the determined projector to project the capture-dependent image captured in the image-capturing azimuth, wherein data of the image is transmitted to the projection device from the flying object through wireless communications.

8. The projection method according to claim 7, wherein the projection device includes a plurality of projectors disposed in different positions, wherein the projection method comprises:

processing the image captured by the image capturing device into the capture-dependent image based on information received from a terminal device;

receiving position information of the terminal device from the terminal device; and based on a positional relationship between the terminal device and the plurality of projectors, causing any of the plurality of projectors located close to the terminal device to project the capture-dependent image.

* * * * *